(12) United States Patent
Hanyu et al.

(10) Patent No.: US 8,140,205 B2
(45) Date of Patent: Mar. 20, 2012

(54) DRIVING SYSTEM FOR HYBRID VEHICLE

(75) Inventors: Tomoyuki Hanyu, Yokohama (JP);
Kazuhiro Takeda, Yokosuka (JP); Yuki Kosaka, Yokohama (JP); Hiraku Ooba, Yokohama (JP); Hiroshi Iwano, Yokohama (JP); Susumu Komiyama, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 937 days.

(21) Appl. No.: 12/159,274

(22) PCT Filed: Jan. 10, 2007

(86) PCT No.: PCT/IB2007/003640
§ 371 (c)(1),
(2), (4) Date: Jun. 26, 2008

(87) PCT Pub. No.: WO2008/032221
PCT Pub. Date: Mar. 20, 2008

(65) Prior Publication Data
US 2008/0306643 A1    Dec. 11, 2008

(30) Foreign Application Priority Data
Jan. 13, 2006    (JP) .................................. 2006-005698

(51) Int. Cl.
*G05D 3/00* (2006.01)
(52) U.S. Cl. ............... 701/22; 322/28; 322/29; 345/212
(58) Field of Classification Search .................... 701/22; 322/28–29; 315/224; 345/204, 211
See application file for complete search history.

(56) References Cited

U.S. PATENT DOCUMENTS
7,626,354 B2 * 12/2009 Hanyu et al. .................. 320/104

FOREIGN PATENT DOCUMENTS

| JP | 61-160322 A | 7/1986 |
|---|---|---|
| JP | 62-36934 U | 3/1987 |
| JP | 2-70935 A | 3/1990 |
| JP | 2-157437 A | 6/1990 |
| JP | 8-214592 A | 8/1996 |
| JP | 10-73161 A | 3/1998 |
| JP | 10-191503 A | 7/1998 |
| JP | 2000-115912 A | 4/2000 |
| JP | 2001-260684 A | 9/2001 |
| JP | 2005-151770 A | 6/2005 |

* cited by examiner

*Primary Examiner* — Thomas Black
*Assistant Examiner* — Luke Huynh
(74) *Attorney, Agent, or Firm* — Global IP Counselors, LLP

(57) ABSTRACT

A hybrid-vehicle driving system includes an engine, a transmission, a first motor/generator provided between the engine and the transmission, and a battery that can charge and discharge the first motor/generator. When an estimated output voltage of the first motor/generator becomes higher than or equal to a predetermined voltage during a gear shift operation of the transmission, the battery is electrically disconnected from the driving system, and the voltage of a power line on the side of the first motor/generator is then decreased so as to charge the battery.

19 Claims, 14 Drawing Sheets

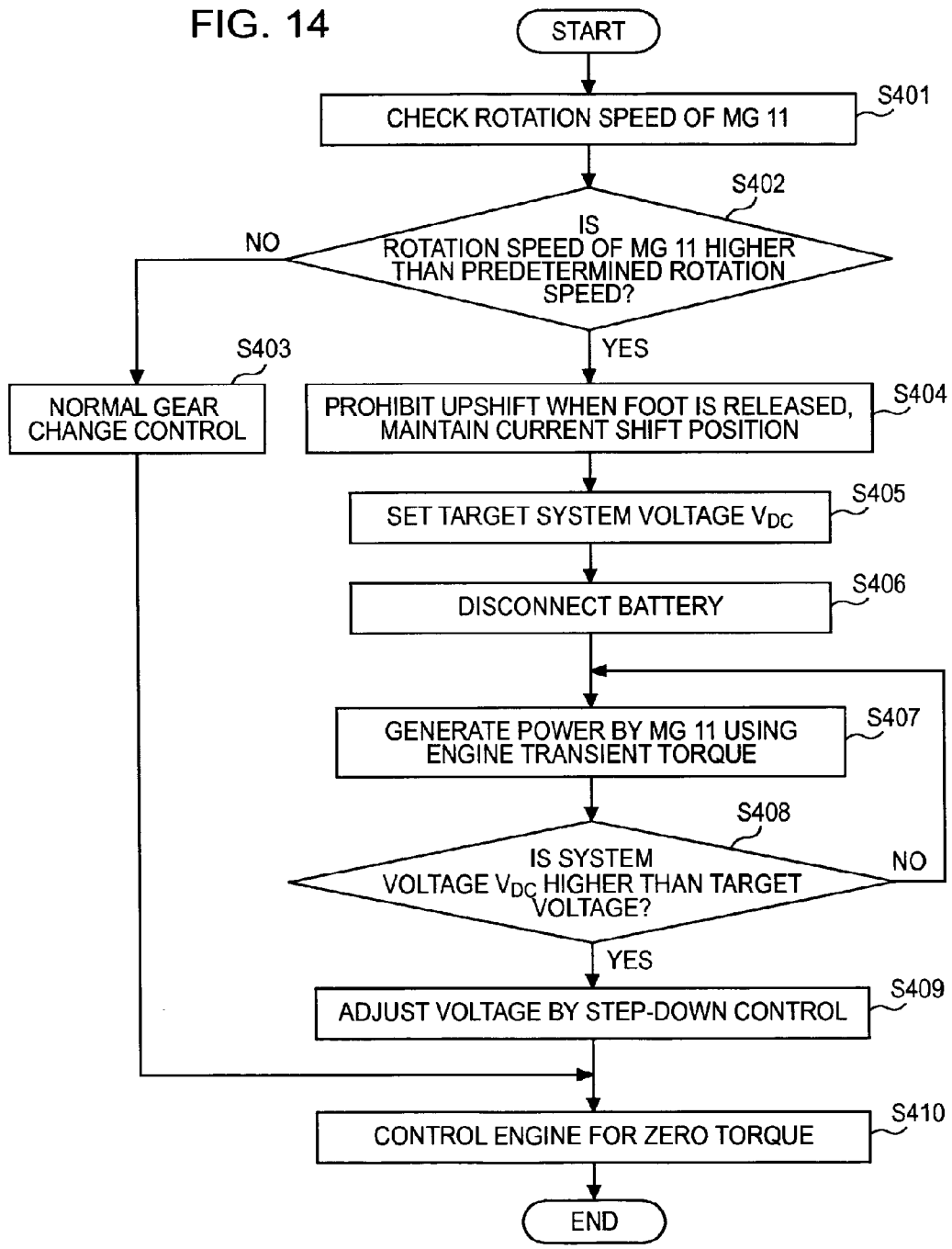

DRIVING SYSTEM FOR HYBRID VEHICLE

BACKGROUND OF THE INVENTION

1. Field of the Invention

The present invention relates to the control and operation of a hybrid vehicle driveline.

2. Description of the Related Art

As a vehicle driving system, a parallel type hybrid-vehicle driving system is known in which an engine and a motor/generator are combined so that outputs of both the engine and the motor/generator can be transmitted to a driving shaft.

In order to increase the output of the motor/generator, it is effective to increase the voltage to be supplied to the motor/generator. In general, however, the supply voltage is regulated by the voltage of a battery, and therefore, the output of the motor/generator normally depends on the battery.

In view of this problem, Japanese Unexamined Patent Application Publication No. 10-191503 discloses a hybrid-vehicle driving system in which a battery is electrically disconnected from a hybrid system including a motor/generator, as required, so that the output power can follow the load.

In the above-described hybrid-vehicle driving system, however, the battery serving as a power storage means cannot be used while being disconnected. Therefore, for example, in a case in which power is generated by the motor/generator during a gear shift operation of a transmission, even when an unnecessary transient power is produced, it is not consumed by any means. For this reason, all the transient power is transmitted as the driving force, and this gives an uncomfortable feeling to the driver.

SUMMARY OF THE INVENTION

The present invention has been made in view of the above-described problems of the related arts, it is desirable to charge a surplus of transient power in a battery by step-down chopping, and to thereby achieve a shorter gear change time and a higher gear shifting performance.

A hybrid-vehicle driving system according to an aspect of the present invention includes an engine, a transmission, a first motor/generator provided between the engine and the transmission, and a battery that charges and discharges the first motor/generator. When an estimated output voltage of the first motor/generator is higher than or equal to a predetermined voltage during a gear shift operation of the transmission, the battery is electrically disconnected from the driving system, and the voltage of a power line on the side of the first motor/generator is decreased so as to charge the battery.

In one example, a hybrid-vehicle control system for controlling a vehicle driveline is provided. The driveline may have an engine, a transmission, a first motor/generator provided between the engine and the transmission, and a battery. The hybrid-vehicle control system has a first inverter, coupled to the first motor/generator, a voltage adjusting circuit coupled to the first inverter and to the battery, the voltage adjusting circuit being configurable to electrically connect the battery and the first inverter, to electrically disconnect the battery and the first inverter, and to adjust a voltage from the first inverter to the battery, and a controller, coupled to at least the first inverter, the voltage adjusting circuit, the battery, the transmission, the controller being configured to issue signals to shift the transmission to a target shift position during a gear shift operation according to a driving force requested by a driver, to control power generation by the first motor/generator during the gear shift operation so that the engine is caused to go to a rotation speed corresponding to the target shift position of the transmission, and to calculate a requested output voltage of the first motor/generator from power generated by the first motor/generator during the gear shift operation. In this example, when the requested output voltage becomes greater than or equal to a predetermined voltage during the gear shift operation, the controller controls the battery voltage adjusting circuit to electrically disconnect the battery from the first inverter to raise an output voltage of the first inverter to the predetermined voltage, and to adjust the output voltage to the first inverter to a second voltage for charging the battery. The predetermined voltage may be a voltage corresponding the battery voltage.

In one aspect of this example, the voltage adjusting circuit charges the battery while maintaining the output voltage of the first motor/generator at the requested output voltage. In another aspect of this example, the controller is configured to control the engine to decrease a torque produced by the engine when the output voltage of the first inverter becomes higher than or equal to a predetermined first limit voltage during the gear shift operation. In another aspect of this example, the controller is further configured to control the engine to increase the torque produced by the engine when the torque of the engine decreases and the output voltage of the first motor/generator falls below the first limit voltage. In another aspect of this example, the controller is further configured to control the motor generator to reduce the electric power generated by the first motor/generator when the output voltage of the first inverter reaches a predetermined second limit voltage higher than the first limit voltage.

In other aspects of this example, the voltage adjusting circuit may include a semiconductor switching element, which may have a controllable switching frequency to adjust the voltage of the inverter to the voltage of the battery. The engine torque control for decreasing the torque of the engine may start when a switching frequency of the semiconductor element exceeds a predetermined frequency.

In another aspect of the present invention, the driveline may further comprise a second motor/generator provided between the transmission and a vehicle driving shaft and a second inverter, coupled to the second motor/generator and to the first inverter. The controller may be further configured to control the driveline such that electrical power generated by the first motor/generator is supplied to drive the second motor/generator during a gear shift operation.

In another aspect of this example, the controller is further configured to cause the voltage adjusting circuit to electrically disconnect the battery while maintaining the shift position of the transmission, and to increase the output voltage of the first inverter by controlling power generation of the first motor/generator when the driving force requested by the driver becomes zero or less and when the rotation speed of the first motor/generator is more than or equal to a predetermined rotation speed. The predetermined rotation speed may be a rotation speed at which an effect is obtained by making the output voltage of the first motor/generator higher than a voltage of the battery.

In another aspect of this example, the driveline further comprises a clutch provided between the engine and the first motor/generator and the controller is further configured to disengage the clutch when the output voltage of the first motor/generator equals the requested output voltage and the torque of the engine is approximately zero.

According to the invention, since power generation of the motor/generator, which has high responsiveness and high accuracy, is controlled during a gear shift operation, the rotation speed of the engine can be quickly led to a target rotation speed, and the gear change time can be shortened. Moreover, a terminal voltage of the motor/generator is increased by a step-down circuit during power generation, and the battery can be charged while the output of the motor/generator is large. This avoids the use of an expensive high-voltage battery and thereby reduces the cost. In addition, even when transient power is produced, a surplus of the power can be charged in the battery. Therefore, a torque shock is reduced, and the gear change performance is enhanced.

BRIEF DESCRIPTION OF THE DRAWINGS

FIG. 14 is a flowchart explaining a foot-release control procedure performed in the hybrid vehicle of the third embodiment.

DESCRIPTION OF THE PREFERRED EMBODIMENTS

Embodiments of the present invention will be described below with reference to the drawings.

First Embodiment

Figure 1:
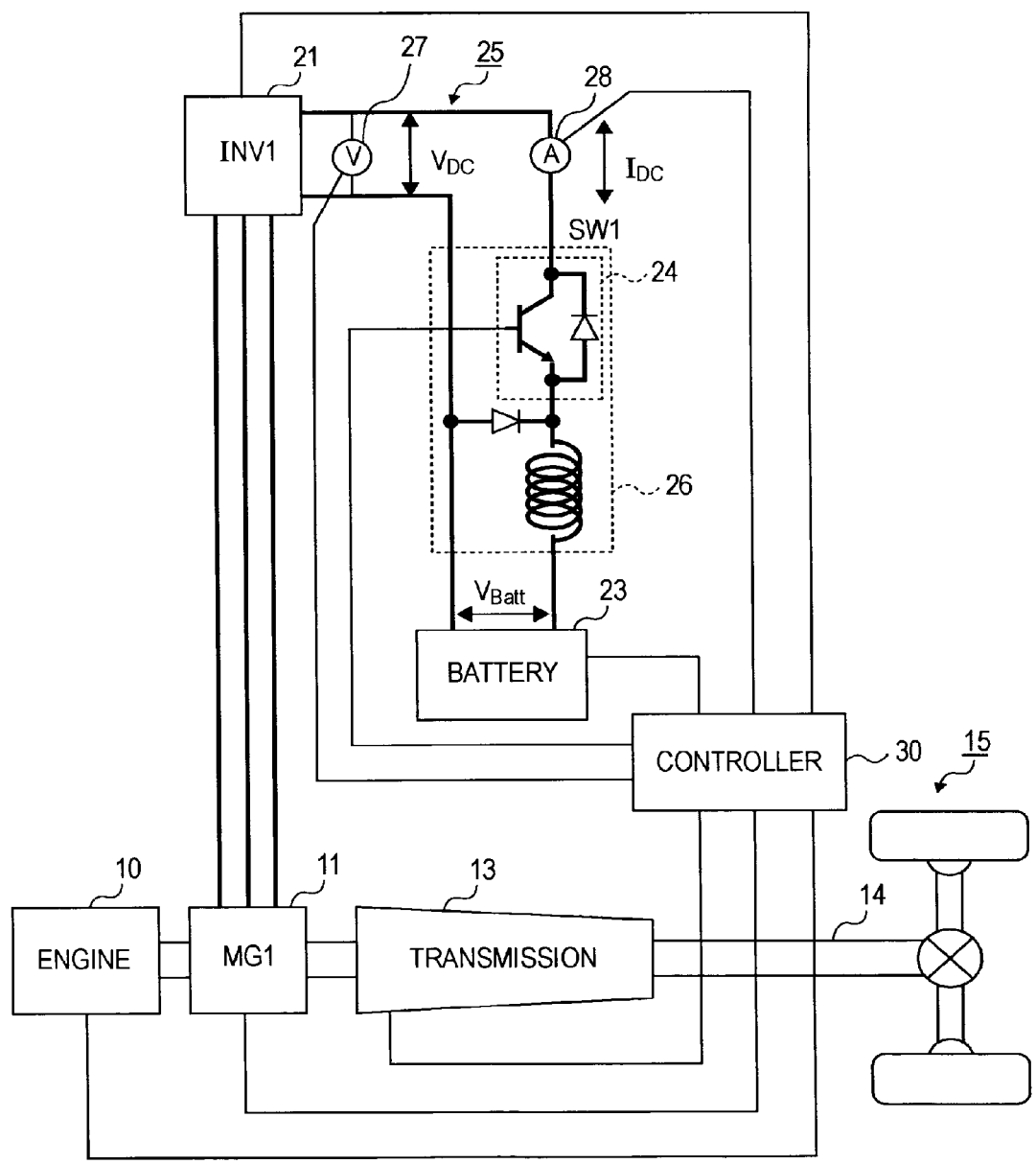
FIG. 1 is a block diagram showing the configuration of a driving system for a hybrid vehicle according to a first embodiment of the present invention.

FIG. 1 is a block diagram showing the configuration of a hybrid-vehicle driving system according to a first embodiment of the present invention.

In the driving system, an engine 10 serves as a prime mover, such as an internal combustion engine, for generating a driving force. A rotation shaft of a motor/generator (hereinafter abbreviated as a MG) 11 (first motor/generator) is coupled to an output shaft of the engine 10. The MG 11 generates electric power by receiving the output of the engine 10, or generates a driving force by receiving power from a battery 23.

The rotation shaft of the MG 11 is also coupled to an input shaft of a transmission 13. The driving force input from the engine 10 and from the MG 11 is provided to the input shaft of the transmission 13 and is subjected to speed reduction (torque multiplication) according to the running condition of the vehicle, and is then output to an output shaft 14. The driving force output to the output shaft 14 is transmitted to right and left driving wheels 15 via a differential gear, thereby driving the vehicle. The transmission 13 may be an automatic transmission having a plurality of shift positions, and may include, for example, a planetary gear mechanism. An alternative example given herein includes an automatic mechanical transmission (AMT) in which a gear shift operation of a manual transmission is automated.

This driving system includes a battery 23 that supplies electric power to the MG 11 and receives electric power from the MG 11 via an inverter 21. The inverter 21 is a three-phase inverter that converts power input/output via a DC terminal from DC to AC and outputs/inputs the converted power via an AC terminal. The inverter 21 is provided between the battery 23 and the MG 11, and is connected at the DC terminal to the battery 23 and at the AC terminal to the MG 11. The rotation speed of the MG 11 is controlled by the inverter 21. The inverter 21 supplies power from the battery 23 to the MG 11, or charges the battery 23 with power generated by the MG 11.

The battery 23 and the DC terminal of the inverter 21 are connected by a DC power line 25.

A switch 24 (battery connection control means) is provided on the power line 25. By controlling opening/closing of the switch 24, the connection between the MG 11 and the battery 23 can be readily controlled. That is, the battery 23 can be freely electrically disconnected from the MG 11. When power is generated by the MG 11 while the switch 24 is open, it is stored in a capacitor built in the inverter 21. Therefore, when the amount of power generated by the MG 11 increases, the potential difference between the terminals of the built-in capacitor increases, and correspondingly, the voltage of the power line 25 (hereinafter referred to as a system voltage) $V_{DC}$ increases. That is, in a state in which the switch 24 is open, the system voltage $V_{DC}$ is determined by the amount of power generated by the MG 11, and can be arbitrarily adjusted by controlling the power generation of the MG 11.

The switch 24 may be of a semiconductor element type, and serves as a part of a voltage adjusting or step-down circuit (voltage adjusting means) 26 provided on the power line 25. The step-down circuit 26 is a step-down chopper circuit that supplies power from the power line 25 to the battery 23 while decreasing the voltage. When the system voltage $V_{DC}$ is higher than or equal to a voltage $V_{BATT}$ of the battery 23 (hereinafter referred to as a battery voltage), the step-down circuit 26 decreases the voltage output to the battery 23 by opening and closing the switch 24 (chopping) at a frequency in accordance with the system voltage $V_{DC}$ (switching frequency of the semiconductor element). The switch 24 in the step-down circuit 26 serves as a switching means that connects and disconnects the power line 25 and the battery 23.

In the first embodiment, the hybrid vehicle includes a controller 30. The controller 30 is formed of a microcomputer including, for example, a CPU, a ROM, a RAM, and other components of known CPUs. The controller 30 controls the operations of the engine 10 and the transmission 13 on the basis of driving conditions of the vehicle detected by various measurements (e.g., engine rotation speed, accelerator-pedal opening degree, vehicle speed, battery voltage, rotation speeds of input/output shafts of transmission). The controller 30 also controls the operation of the MG 11 by controlling the inverter 21 and the switch 24.

More specifically, during a gear shift operation of the transmission 13, the controller 30 controls the rotation speed of the MG 11 so as to quickly change the input rotation speed of the transmission 13 to a target rotation speed. In this case, the controller 30 controls the step-down circuit 26 and the switch 24 provided between the MG 11 and the battery 23 so that the rotation speed of the MG 11 can be controlled.

A description will now be given of the principle of control exerted over the input rotation speed of the transmission 13 during a gear shift operation. In the first embodiment, the transmission 13 is an automatic transmission having a plurality of shift positions. During an upshift operation, the rotation speed of the engine 10 on the input side of the transmission 13 needs to decrease. Herein, a method of decreasing the rotation speed of the engine 10 using power generation of the MG 11 is described below.

When an automatic transmission having a plurality of shift positions performs an upshift, the target rotation speed of the engine 10 may be determined by the vehicle speed and the gear ratio of the transmission 13 after the upshift. Accordingly, during a gear change operation, the speed of the MG 11 is controlled so that the engine 10 is caused to go to a target rotation speed. The speed of the MG 11 can be controlled with higher accuracy than the engine or the clutch controls. Therefore, the rotation speed of the engine 10 can be easily led to the target value by controlling the speed of the MG 11. Since the rotation speed of the engine 10 needs to be decreased in an upshift operation, the MG 11 is used to apply a negative torque. To do this, the MG 11 is operated as a generator. Therefore, the load torque applied to the engine 10 is increased by increasing the power generated by the MG 11, and this allows the rotation speed to swiftly reach the target value.

In this case, the presence of the battery 23 may be disadvantageous. In a general type of synchronous motor or generator, it can be expected that the output increases as the supplied voltage increases. However, since the battery 23 exists, it is difficult to increase the system voltage $V_{DC}$ above the battery voltage $V_{BATT}$, and consequently, the upper limit of the power generated by the MG 11 depends on the battery voltage $V_{BATT}$.

Accordingly, in the first embodiment, the battery 23 may be disconnected from the power line 25 by opening the switch 24 in a gear change operation. When the power generated by the MG 11 increases in a state in which the battery 23 is disconnected from the power line 25, the charges at the terminals of the capacitor built in the inverter 21 increase, and the system voltage $V_{DC}$ increases. Therefore, the power generated by the MG 11 can be increased without depending on the battery voltage $V_{BATT}$, and the rotation speed of the engine 10 can swiftly reach the target value. When the system voltage $V_{DC}$ exceeds the target voltage by power generation of the MG 11, opening and closing of the switch 24 in the step-down circuit 26 are controlled, and the power generated by the MG 11 is charged in the battery 23 while decreasing the voltage.

Figure 2:
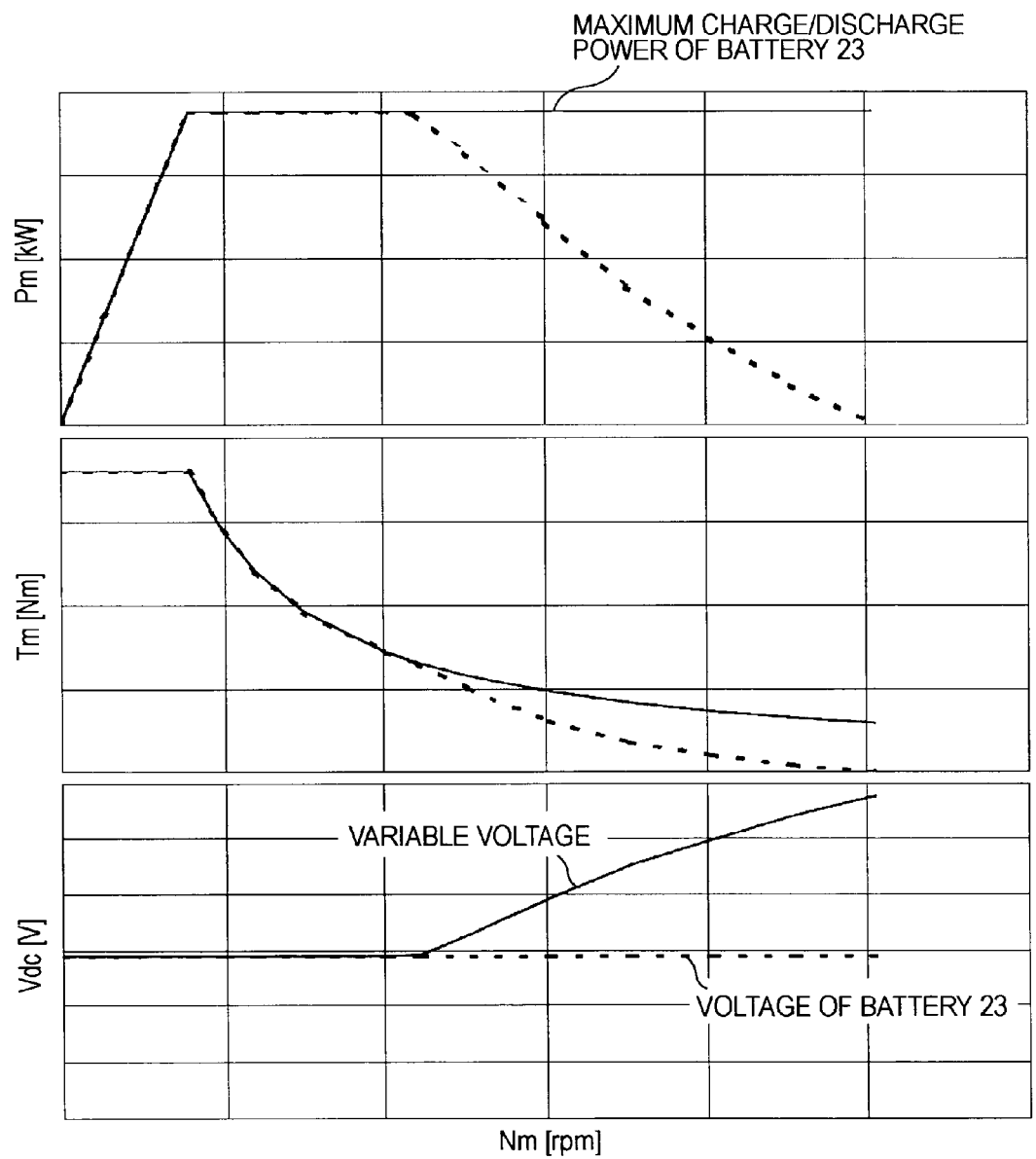
FIG. 2 is an explanatory view showing characteristics of a motor/generator in the hybrid vehicle.

FIG. 2 illustrates certain characteristics of the MG 11 in the hybrid vehicle according to the first embodiment. An upper part of FIG. 2 shows the shaft output power (Pm) with respect to the rotation speed of the MG 11, a middle part shows the shaft torque (Tm) with respect to the rotation speed of the MG 11, and a lower part shows the system voltage ($V_{DC}$) with respect to the rotation speed of the MG 11.

In the hybrid vehicle, high torque is generally required of the MG. For this reason, the magnets in the MG are typically large, and a back electromotive force (back EMF) increases during high-speed rotation. Therefore, the output power decreases if the terminal voltage of the inverter 21, that is, the system voltage $V_{DC}$ remains equal to the battery voltage $V_{BATT}$. Accordingly, high output can be maintained even during high-speed rotation by controlling the switch 24 so as to change the terminal voltage $V_{DC}$ of the inverter 21, as shown in the lower part of FIG. 2.

When a large-displacement engine and a MG are combined in a hybrid vehicle, the MG is required to produce high torque for starting the engine. On the other hand, after the engine is started, the demand on the MG to assist the engine torque decreases in a middle rotation-speed range in which a sufficient engine torque can be produced. However, since the engine inertia is high, when the transmission 13 performs a gear shift operation, a gear shift shock may be caused by breaking the torque of the engine 10 every time the shift position is changed. This may result in an uncomfortable feeling to the driver particularly in an upshift operation.

In order to reduce the gear shift shock, gear shifting time may be reduced. In this regard, during an upshift, MG 11 may be used as a generator to use the rotational inertial energy of the engine 10 to generate electrical power and to reduce the time for the engine 10 to slow to a target rotational speed. In this case, the system voltage (inverter terminal voltage) $V_{DC}$ can be increased independently of the battery voltage $B_{BATT}$ by the MG 11 generating electric power from the rotational inertial energy of the engine 10 in a state in which the battery 23 is electrically disconnected from the inverter 21. That is, since power generated by the MG 11 can be increased without depending on the battery voltage $V_{BATT}$, the rotation speed of the engine 10 can more quickly reach the target value, and this can reduce the gear change time.

The above-described control is also effectively applied to a step up/down circuit. Directly before a gear shift operation starts, the voltage of the power line 25 may be increased and all battery power is used so that the MG 11 assists the engine torque. In contrast, during the gear shift operation, a switch of the step up/down circuit is controlled to disconnect the battery 23, and power can be generated by the MG 11 using the rotational inertial energy of the engine 10. Further, a high inverter terminal voltage can be obtained.

The control by the controller 30 will be specifically described below with reference to FIGS. 3 and 4.

Figure 3:
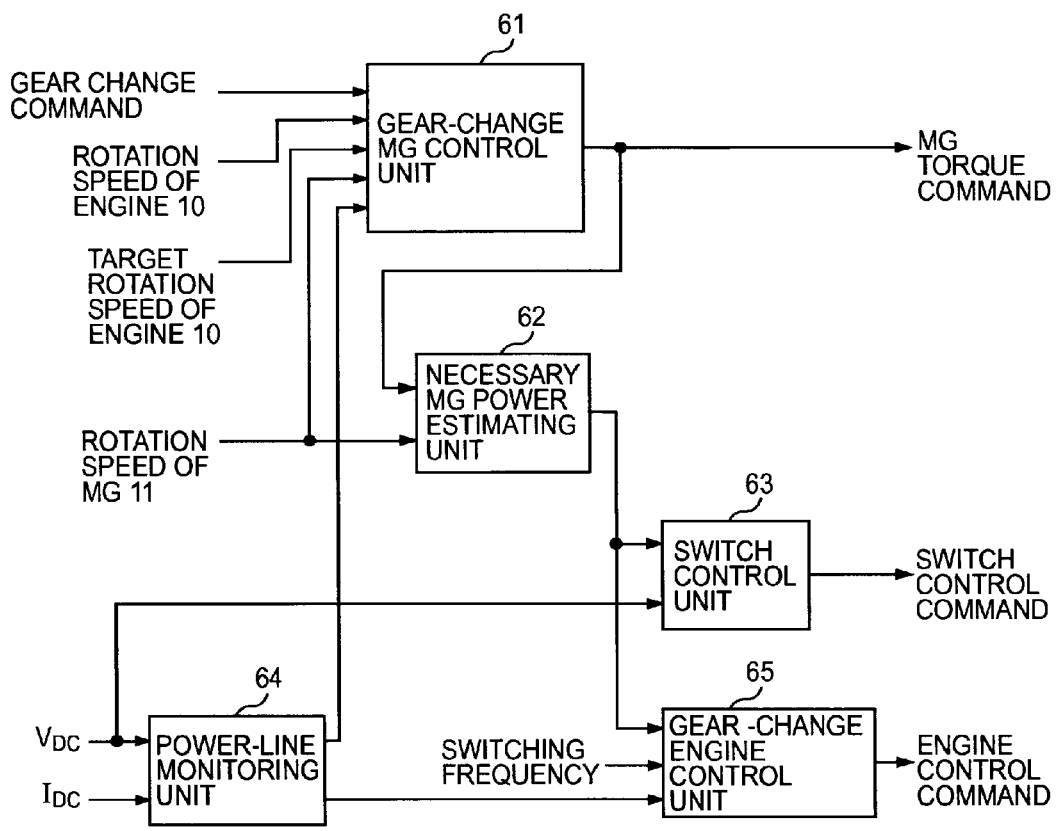
FIG. 3 is a control block diagram explaining gear change control of the hybrid vehicle.

FIG. 3 is a control block diagram showing a part of gear change control exerted by the controller 30 in the hybrid vehicle according to the first embodiment. The controller 30 calculates a requested driving force on the basis of, for example, the accelerator-pedal opening degree and vehicle speed detected by an accelerator-pedal opening degree sensor and a vehicle-speed sensor (not shown), and issues a gear change command with reference to a predetermined gear change map. The controller 30 also calculates a target engine rotation speed corresponding to a target shift position. A detailed description will be given below of the control exerted over the engine 10 and the MG 11 when a gear change command is issued. Since the gear shift control of the transmission 13 itself is performed in the same manner as before, the prior descriptions are incorporated herein.

A voltage $V_{DC}$ and a current $I_{DC}$ of the power line 25 are input to a power-line monitoring unit 64. The voltage $V_{DC}$ and the current $I_{DC}$ are detected by a voltage sensor (voltage measuring means) 27 and a current sensor 28.

The power-line monitoring unit 64 sets/resets an engine-torque control flag for a gear-change engine control unit 65 on the basis of the input values. The power-line monitoring unit 64 also sets/resets a speed control stop flag for a gear-change MG control unit 61.

In a state in which the battery 23 is disconnected from the system, the system voltage $V_{DC}$ varies with the amount of power generated by the MG 11. In this case, when the system voltage $V_{DC}$ increases corresponding to the amount of power generated by the MG 11 and becomes higher than or equal to a predetermined value $V_1$, an engine-torque control flag is set so as to decrease the engine torque. When the system voltage $V_{DC}$ further increases and becomes higher than or equal to a predetermined value $V_2$ ($>V_1$), a speed control stop flag for the MG 11 is set so as to reduce the power generated by the MG 11.

A gear change command, a target engine rotation speed $tN_{ENG10}$ corresponding to a target shift position, a real rotation speed $rN_{MG11}$ of the MG 11, a real rotation speed $rN_{ENG10}$ of the engine 10, and a speed control stop flag are input to the gear-change MG control unit 61.

Upon receiving a gear change command, the gear-change MG control unit 61 controls the speed of the MG 11, and calculates a target torque output $tT_{MG11}$ of the MG 11 on the basis of the input values. The target torque output $tT_{MG11}$ of the MG 11 is given by the following Expression 1:

$$tT_{MG11} = K(tN_{ENG10} - rN_{ENG10}) \tag{1}$$

where K represents the control gain.

According to Expression 1, when the real rotation speed $rN_{ENG10}$ of the engine 10 is higher than the target engine rotation speed $tN_{ENG10}$ corresponding to the target shift position ($rN_{ENG10} > tN_{ENG10}$), a negative torque is applied to the MG 11, and the MG 11 operates as a generator. In contrast, when the real rotation speed $rN_{ENG10}$ of the engine 10 is lower than the target engine rotation speed $tN_{ENG10}$ corresponding to the target shift position ($rN_{ENG10} < tN_{ENG10}$), a positive torque is applied to the MG 11, and the MG 11 operates as a motor.

When a speed control stop flag is set, control is exerted so as to bring the MG 11 into a no-load state.

The real rotation speed $rN_{MG11}$ of the MG 11 and the target torque output $tT_{MG11}$ of the MG 11 are input to a necessary MG power estimating unit 62.

On the basis of these input values, the necessary MG power estimating unit 62 calculates a power $tP_{MG11}$ generated by the MG 11 during speed control. The power $tP_{MG11}$ of the MG 11 is given by the following Expression 2:

$$tP_{MG11} = tT_{MG11} \times rN_{MG11} \times 1/\eta_{MG11} \tag{2}$$

where $\eta_{MG11}$ represents the power generation efficiency of the MG 11, and is prestored as a map in the controller 30. For example, $\eta_{MG11}$ may be calculated from the current $I_{DC}$ of the power line 25.

The generated power $tP_{MG11}$ of the MG 11 and the voltage $V_{DC}$ of the power line 25 are input to a switch control unit 63.

The switch control unit 63 issues a control command for the switch 24 on the basis of the generated power $tP_{MG11}$ and the voltage $V_{DC}$, and opens/closes the switch 24. That is, when the switch control unit 63 determines that the generated power $tP_{MG11}$ of the MG 11 increases and the system voltage $V_{DC}$ exceeds the battery voltage $V_{BATT}$, it opens the switch 24 so as to disconnect the battery 23 and the power line 25. Subsequently, the switch control unit 63 exerts step-down control using the step-down circuit 26. The step-down circuit 26 may include, for example, the switch 24, a reactor, a diode, a capacitor, and other known components. By adjusting the open/close time of the switch 24, power is supplied to the battery 23 while the system voltage $V_{DC}$ is maintained at the voltage requested by the MG 11 during power generation control.

After the gear change control is completed, when the system voltage $V_{DC}$ becomes substantially equal to the battery voltage $V_{BATT}$, the switch 24 is closed so as to connect the battery 23 and the power line 25.

The generated power $tP_{MG11}$ of the MG 11, an engine-torque control flag, and a switching frequency of the switch 24, which will be described below, are input to a gear-change engine control unit (engine-torque control means) 65.

The gear-change engine control unit 65 controls the torque of the engine 10 on the basis of these input values. That is, when the system voltage $V_{DC}$ increases with the power generated by the MG 11 even after the switching frequency of the switch 24 reaches a predetermined frequency, and exceeds the predetermined value $V_1$, the gear-change engine control unit 65 exerts control for decreasing the engine torque.

Figure 4:
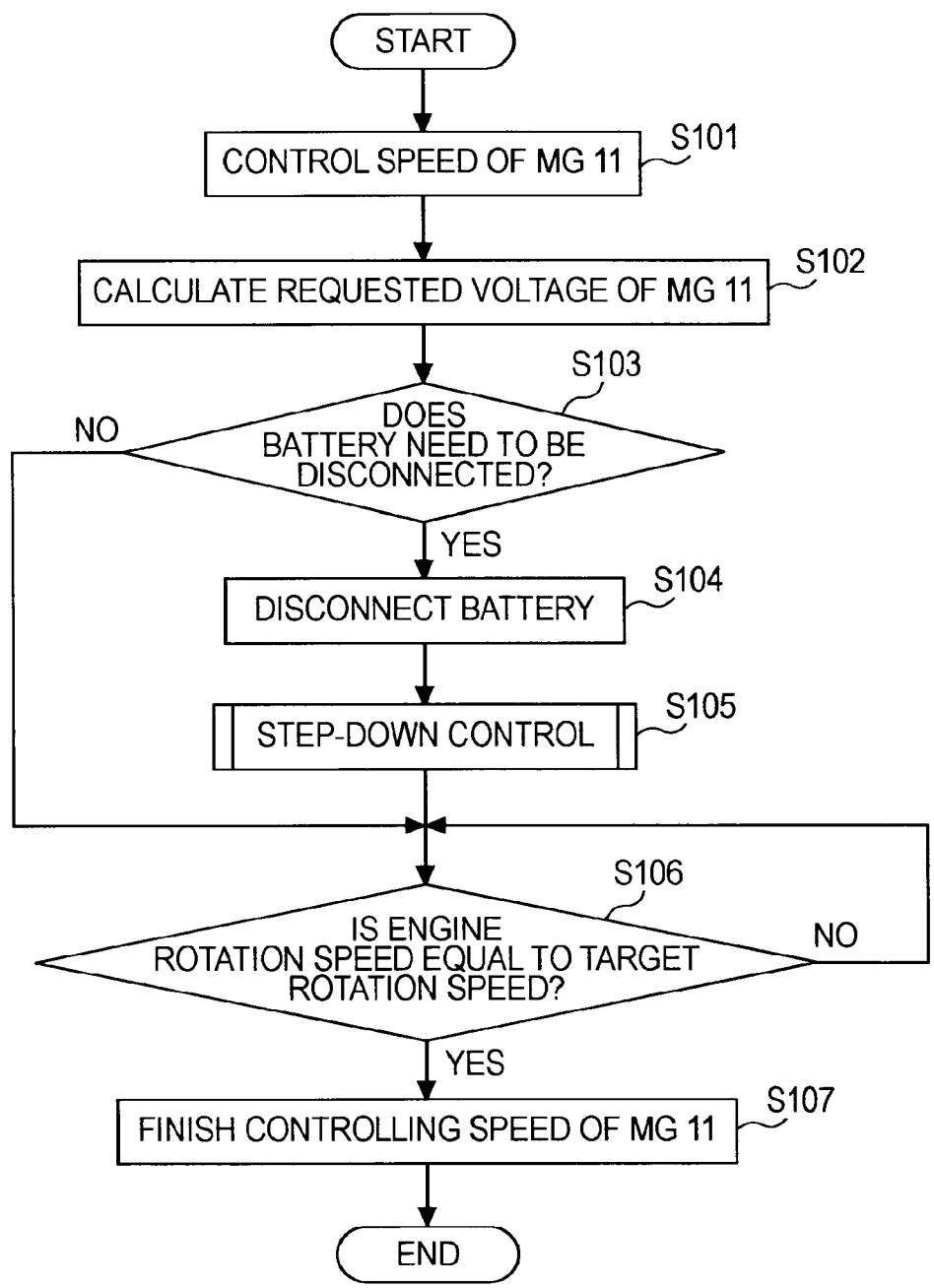
FIG. 4 is a flowchart showing a gear change control procedure performed in the hybrid vehicle.

FIG. 4 is a flowchart showing a part of a gear-change control procedure performed by the controller 30 in the hybrid vehicle according to the first embodiment. The following procedure is repeated at predetermined intervals.

First, gear change control of the transmission 13 starts in response to a gear change command issued from the controller 30, control of the rotation speed of the MG 11 starts in Step S101. Then, a target torque output $tT_{MG11}$ of the MG 11 is calculated from a target engine rotation speed $tN_{ENG10}$ corresponding to a target shift position and a real rotation speed $rN_{ENG10}$ of the engine 10 (see Expression 1), as described above. Since the real rotation speed $rN_{ENG10}$ is higher than the target rotation speed $tN_{ENG10}$ in an upshift operation, the MG 11 applies a negative torque, and the MG 11 operates as a generator.

In Step S102 (output-voltage estimating means), a requested voltage of the MG 11, that is, a voltage necessary to be applied to the terminal voltage $V_{DC}$ of the inverter 21 (output voltage of the MG 11) is calculated from a generated power $tP_{MG11}$ of the MG 11 (see Expression 2) and the gear change time.

In Step S103, when the requested voltage of the MG 11 calculated in Step S102 is higher than or equal to the battery voltage $V_{BATT}$, Step S104 is performed to disconnect the battery 23 and the power line 25. In contrast, when the requested voltage of the MG 11 is lower than the battery voltage $V_{BATT}$, the battery 23 is not disconnected, and Step S106 is performed.

In Step S104, the battery 23 is disconnected by opening the switch 24. The battery 23 is considered disconnected when an input/output current of the battery 23 becomes substantially zero.

When the battery 23 is disconnected in Step S104, a step-down control subroutine is performed in Step S105 so as to decrease the system voltage $V_{DC}$ while maintaining the voltage at the requested voltage of the MG 11. Consequently, even when the terminal voltage $V_{DC}$ of the inverter 21 increases above the requested voltage of the MG 11, it can be prevented from further increasing, and a surplus power can be charged in the battery 23. Therefore, the MG 11 can generate a large quantity of power even in a high-speed rotation range. Moreover, since the responsiveness of speed control increases, the gear change time can be shortened further. Details of the step-down control subroutine will be described below.

In Step S106, it is determined whether the rotation speed of the engine 10 is equivalent to the target rotation speed. When the rotation speed of the engine 10 decreased by the speed control of the MG 11 is higher than the target rotation speed corresponding to the target shift position, the speed control of the MG 11 is continued until the engine rotation speed becomes equal to the target rotation speed. In contrast, when the rotation speed of the engine 10 is equal to the target rotation speed, Step S107 is performed.

In Step S107, the speed control of the MG 11 is completed. When the battery 23 has been disconnected from the power line 25, it is connected thereto, and the gear change control of the transmission 13 is completed.

Figure 5:
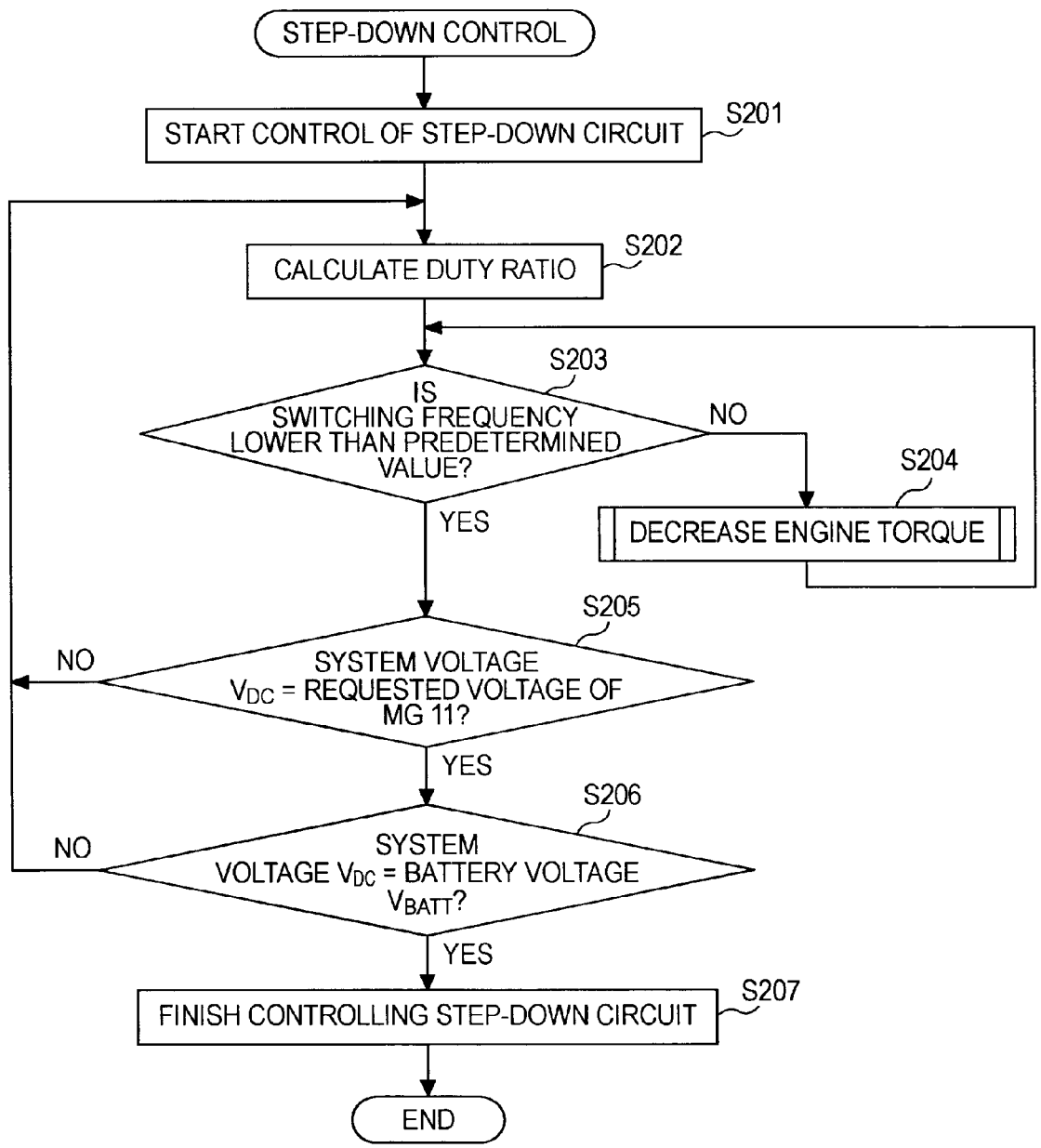
FIG. 5 is a flowchart explaining a step-down control process in the gear change control procedure.

Details of the step-down control subroutine performed in Step S105 in the above-described gear change control procedure will now be described with reference to FIG. 5.

First, control of the step-down circuit 26 by the controller 30 starts in Step S201. The controller 30 outputs a pulse signal so as to open/close the switch 24.

In Step S202, the duty ratio of a pulse signal for adjusting the open/close time of the switch 24 is calculated.

In Step S203, it is determined whether the frequency of the pulse signal is lower than or equal to a predetermined value. When the frequency is higher than the predetermined value, the torque of the engine 10 is decreased in Step S204. This is because the upper limit of the switching frequency of the step-down circuit 26 is determined by the frequency characteristic of the switch 24 and the impedance characteristics of the reactor, the battery 23 and the capacitor, and the step-down control cannot be carried out above the upper limit. Therefore, when the frequency of the pulse signal reaches a predetermined frequency lower than the upper limit, the torque of the engine 10 is decreased in Step S204, thereby reducing the power generated by the MG 11 and preventing the increase in the system voltage $V_{DC}$. Since the torque control of the engine 10 is less responsive than the speed control of the MG 11 and the control of the switch 24, it causes a delay. For this reason, the above-described predetermined frequency is set in consideration of the delay. Details of the engine-torque decreasing subroutine performed in Step S204 will be described below.

When the frequency of the pulse signal is lower than or equal to the predetermined value in Step S203, the system voltage $V_{DC}$ and the requested voltage of the MG 11 are compared in Step S205. When there is a difference between these voltages, the duty ratio of the pulse signal is calculated again in Step S202 so as to remove the difference. In contrast, when there is no difference, Step S206 is performed.

In Step S206, the system voltage $V_{DC}$ and the battery voltage $V_{BATT}$ are compared. This is because the MG 11 can generate a target torque at the voltage of the battery 23 when there is no difference between the voltages. Therefore, the system voltage $V_{DC}$ is equal to the battery voltage $V_{BATT}$, the MG 11 can generate a target torque at the voltage of the battery 23, and Step S207 is then performed. In contrast, there is a difference between the voltages, Step S202 is performed again to calculate the duty ratio of the pulse signal.

In Step S207, the step-down control of the step-down circuit 26 is finished, the battery 23 and the power line 25 are connected, and the step-down control subroutine is completed.

Figure 6:
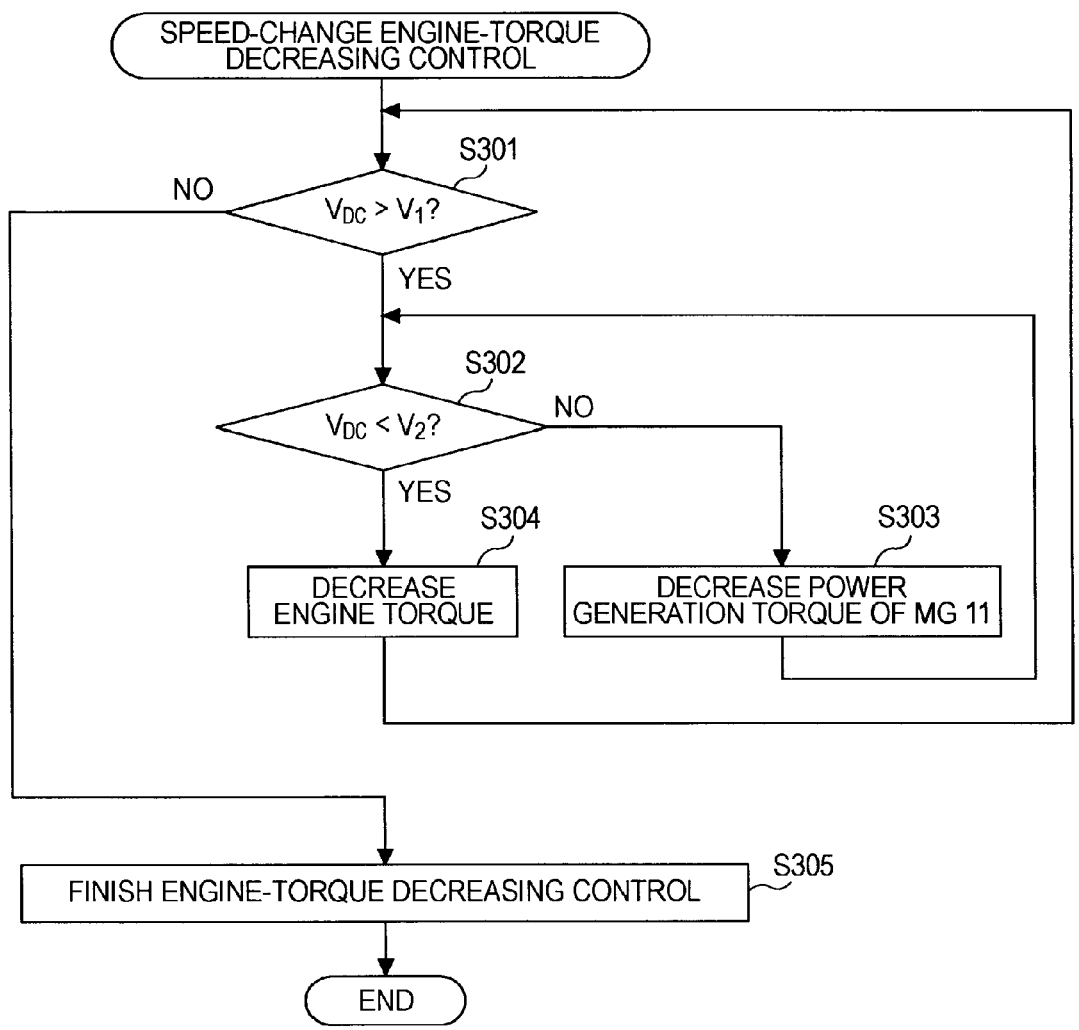
FIG. 6 is a flowchart explaining an engine-torque decreasing process in the gear change control procedure.

A description will now be given of the engine-torque decreasing subroutine performed in Step S204 of the above-described step-down control subroutine, with reference to FIG. 6.

First, in Step S301, it is determined whether the system voltage $V_{DC}$ is higher than the first limit value $V_1$. When the system voltage $V_{DC}$ is higher than the first limit value $V_1$, the procedure proceeds to Step S302 for decreasing the torque of the engine 10. The torque is decreased when the system voltage $V_{DC}$ is higher than the first limit voltage $V_1$ because an overvoltage damage occurs to the capacitor built in the inverter 21 when the power $tP_{MG11}$ generated by the MG 11 is large. In contrast, when the system voltage $V_{DC}$ is lower than or equal to the first limit voltage $V_1$, the engine-torque decreasing control is finished in Step S305, and this routine is completed.

When the system voltage $V_{DC}$ exceeds the first limit voltage $V_1$, it is further determined in Step S302 whether the system voltage $V_{DC}$ is lower than the second limit voltage $V_2$. Since the torque control of the engine 10 causes a delay, when the system voltage $V_{DC}$ is higher than the second limit value $V_2$ (close to the upper limit voltage of the capacitor), the torque decreasing control would be too late. Accordingly, when the system voltage $V_{DC}$ is higher than the second limit voltage V2, in Step S303, power generation by the MG 11 is prevented. The power generation is prevented until the system voltage $V_{DC}$ falls below the second limit value $V_2$. In contrast, when the system voltage $V_{DC}$ is lower than the second limit voltage $V_2$, that is, when $V_1 < V_{DC} < V_2$, the engine torque is decreased in Step S304.

In Step S304, the engine torque is decreased. In order to decrease the engine torque, first, the ignition timing, which is most highly responsive, is retarded. Since the output of the engine 10 can be measured by the power state of the power line 25 during a gear change operation, the degree of retardation of the ignition timing can be fed back. This can prevent a loss of fuel economy from a delay in control.

When the system voltage $V_{DC}$ cannot be made lower than the first limit voltage $V_1$ only by controlling the ignition timing, the opening degree of a throttle valve is also controlled. The engine torque can be further decreased by cutting the fuel.

When the system voltage $V_{DC}$ falls below the first limit voltage $V_1$, the procedure proceeds from Step S301 to Step S305, the engine-torque decreasing control is finished, and the subroutine is completed.

Figure 7:
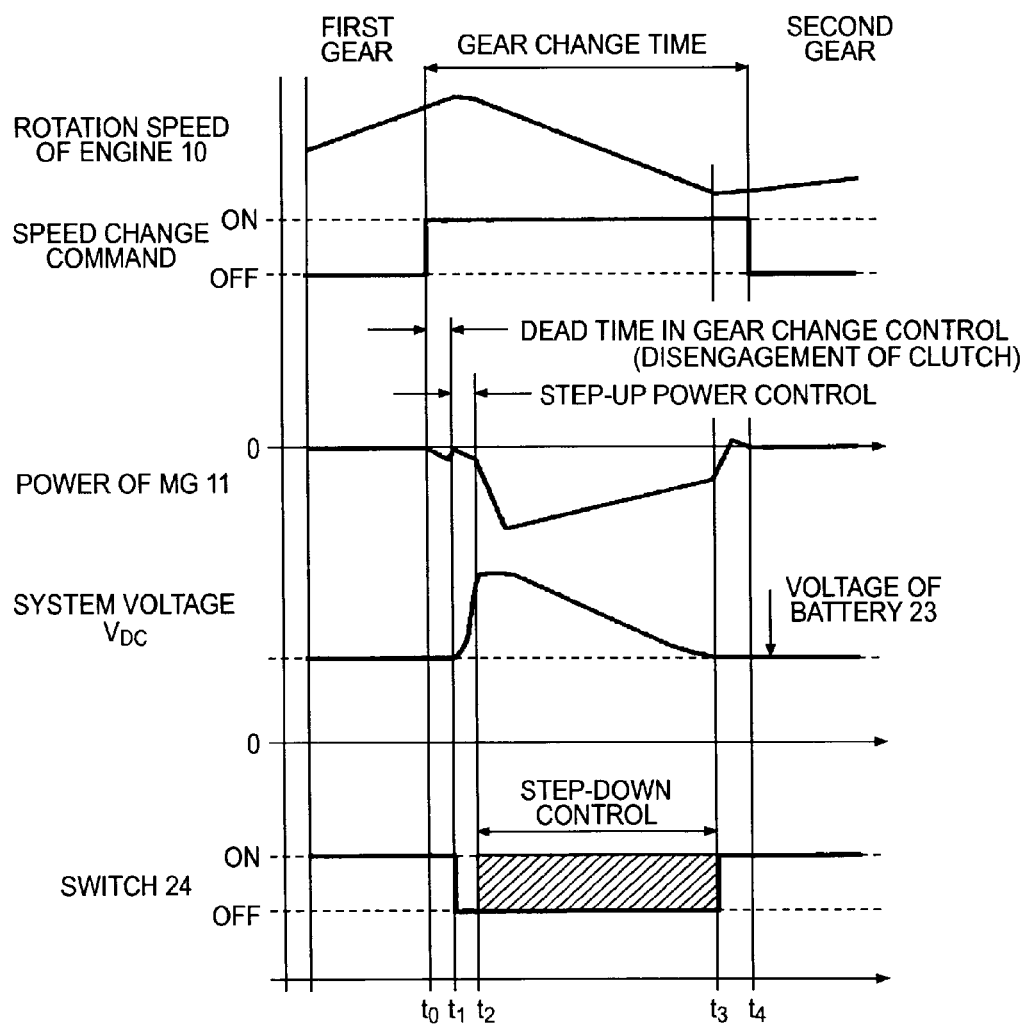
FIG. 7 is a diagram explaining an upshift operation in the hybrid vehicle.

FIG. 7 is a diagram showing an example of an upshift operation of the hybrid vehicle according to the first embodiment.

When a gear change command is turned on and gear change control is started at a time to, the MG 11 starts speed control. Since an upshift is performed, power generation of the MG 11 is controlled.

Power generated by the MG 11 is increased by power generation control. When it is determined that the system voltage $V_{DC}$ exceeds the battery voltage $V_{BATT}(t_1)$, the switch 24 is opened (OFF) so as to disconnect the battery 23.

When the system voltage $V_{DC}$ reaches the requested voltage of the MG 11 at a time $t_2$, step-down control of the step-down circuit 26 starts to control the switch 24, and a surplus power is charged in the battery 23. Since the power generated by the MG 11 decreases as the rotation speed of the engine 10 decreases, the system voltage $V_{DC}$ decreases ($t_2$ to $t_3$).

When the system voltage $V_{DC}$ becomes equal to the battery voltage $V_{BATT}$, the step-down control of the step-down circuit 26 is stopped, and the switch 24 is brought into a connection state ($t_3$). Subsequently, torque recovery ($t_3$ to $t_4$) is performed, and the gear change is completed ($t_4$).

Figure 8:
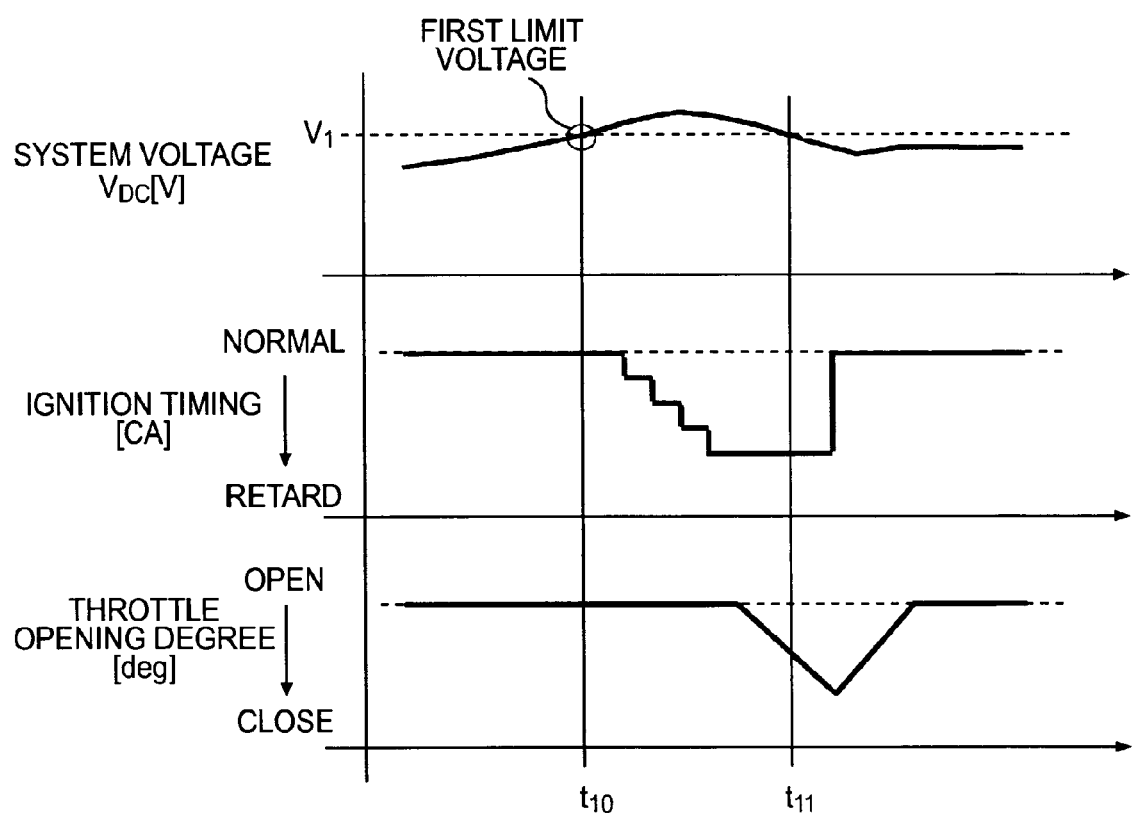
FIG. 8 is a diagram showing an example of a state of an engine-torque decreasing means and a power line during the upshift operation.

FIG. 8 is a diagram showing an example of the torque decreasing control of the engine 10 and the state of the power line 25 while the battery 23 is disconnected from the power line 25 in FIG. 7.

When the system voltage $V_{DC}$ exceeds the first limit voltage $V_1$ at a time $t_{10}$, the ignition timing is retarded. By retarding the ignition timing, the combustion efficiency of the engine 10 serving as an internal combustion engine is lowered, and consequently, the output is reduced. When the system voltage $V_{DC}$ does not fall below the first limit voltage $V_1$ only by retarding the ignition timing, the output is reduced by adjusting the opening degree of the throttle valve so as to limit the amount of intake air.

When the system voltage $V_{DC}$ falls below the first limit value $V_1$ ($t_{11}$), the ignition timing and the throttle valve opening degree are returned to the states before the gear change, and normal control is exerted.

Figure 9:
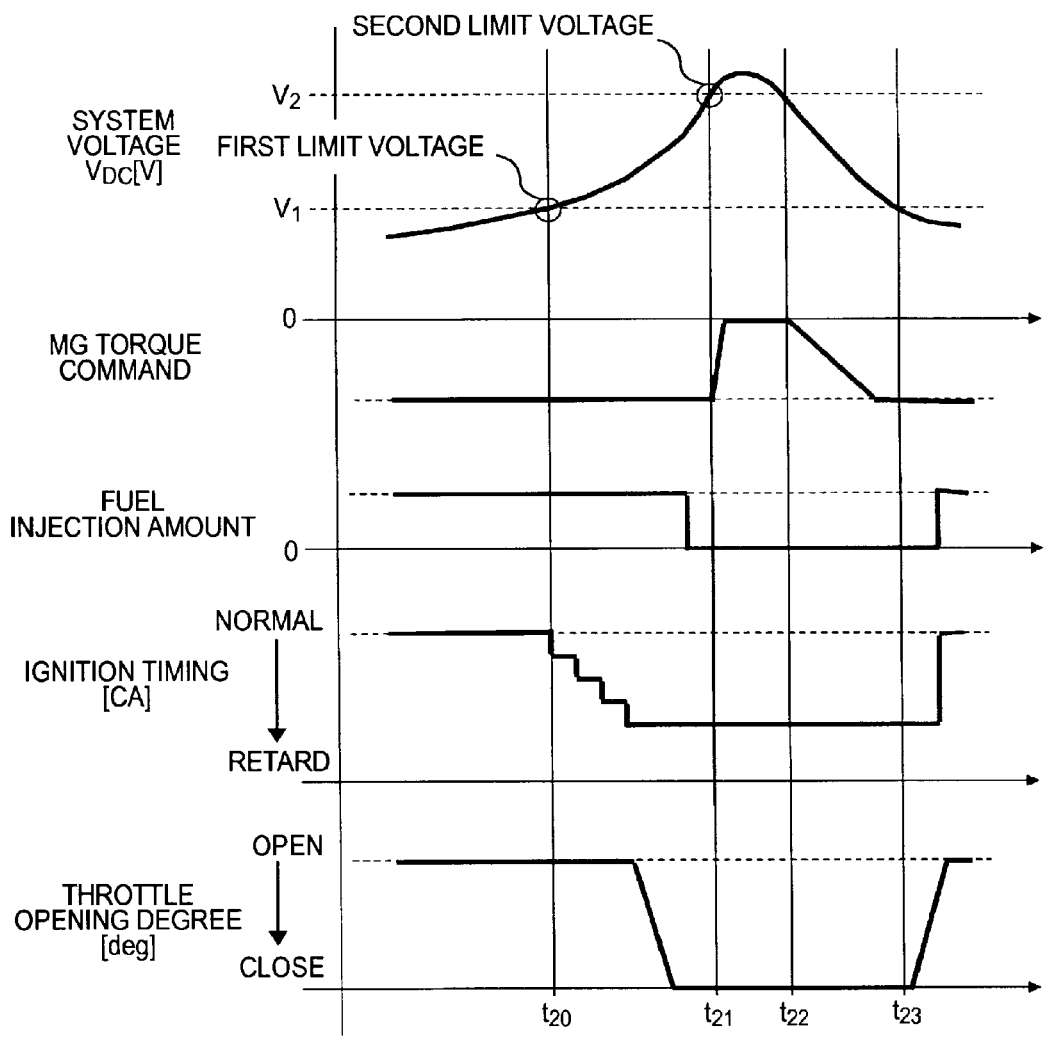
FIG. 9 is a diagram showing another example of a state of the engine-torque decreasing means and the power line during the upshift operation.

FIG. 9 is a diagram showing other examples of the torque decreasing control of the engine 10 and the state of the power line 25 while the battery 23 is disconnected from the power line 25 in FIG. 7.

When the system voltage $V_{DC}$ exceeds the first limit voltage $V_1$ at a time $t_{20}$, the ignition timing is retarded. Unlike the case shown in FIG. 8, when the system voltage $V_{DC}$ does not fall below the first limit voltage V1 only by retarding the ignition timing, the opening degree of the throttle valve is adjusted, and fuel injection is stopped, as required, thereby applying a negative torque to the engine 10. When the system voltage $V_{DC}$ further increases and exceeds the second limit voltage $V_2$, the power control of the MG 11 is stopped ($t_{21}$). Since the step-down control of the step-down circuit 26 is being exerted during this time, the system voltage $V_{DC}$ is decreased by stopping the power generation control of the MG 11.

When the system voltage $V_{DC}$ falls below the second limit voltage $V_2$ at a time $t_{22}$, power generation control of the MG 11 is restarted. When the system voltage $V_{DC}$ also falls below the first limit voltage $V_1$, the operating state of the engine 10 is returned to its initial state. In this case, the control of the throttle valve, which has the lowest responsiveness, is first exerted, and the ignition timing and the fuel injection amount are then returned to their initial states.

Figure 10:
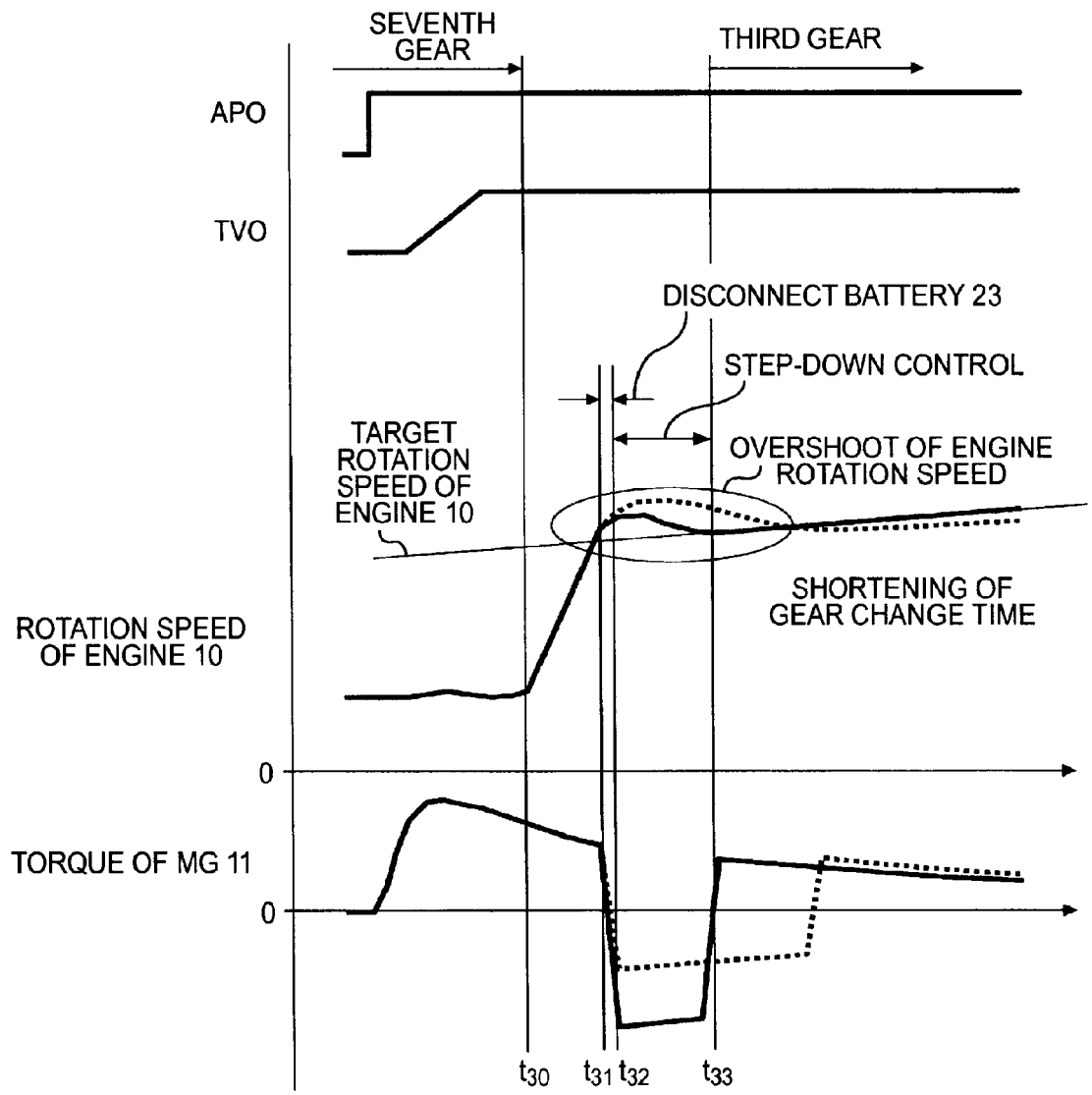
FIG. 10 is a diagram explaining a downshift operation in the hybrid vehicle.

FIG. 10 is a diagram showing a downshift operation in the hybrid vehicle according to the first embodiment. Herein, a description will be given of a downshift from the seventh gear to the third gear.

When the accelerator-pedal opening degree (hereinafter referred to as APO) serving as an acceleration request command from the driver increases, the vehicle is accelerated. In this case, a torque is first generated in the MG 11 having superior responsiveness. Subsequently, the throttle valve is opened by controlling the throttle-valve opening degree (hereinafter referred to as TVO), thereby also generating a torque in the engine 10. Further, downshift control of the transmission 13 is started, and the engine rotation speed is increased by the torque of the engine 10 itself due to disengagement of the clutch ($t_{30}$). When the transmission 13 is automatic, the torques of the engine 10 and the MG 11 are transmitted as vehicle driving forces by the clutch in the transmission 13.

For the downshift operation of the transmission 13, it is necessary to increase the rotation speed of the engine 10. However, since the control of the TVO causes a delay, as described above, when the rotation speed of the engine 10 increases, it exceeds the target rotation speed, that is, an overshoot occurs. This prolongs the gear change time.

Accordingly, the MG 11 is controlled during the gear change in order to prevent an overshoot ($t_{31}$ to $t_{33}$). Specifically, the battery 23 is disconnected ($t_{31}$ to $t_{32}$), and the power generated by the MG 11 is increased ($t_{32}$ to $t_{33}$). As a result, an overshoot can be quickly prevented, and the gear change time can be improved.

According to the above-described first embodiment, during vehicle gear change, the rotation speed of the engine 10 can be quickly brought to the target value and the gear change time can be shortened by controlling power generation of the MG 11 that is superior in responsiveness and accuracy. The power generated by the MG 11 can be increased without depending on the battery voltage by disconnecting the battery 23 from the system, depending on the amount of the generated power. This allows gear changes to be performed more quickly. Since the voltage of the battery can be prevented from increasing, the cost can be reduced.

Even when the system voltage $V_{DC}$ increases above the requested voltage of the MG 11 during power generation control of the MG 11, it can be prevented from further increasing by the step-down control of the step-down circuit 26, and a surplus power can be charged in the battery 23. Therefore, the MG 11 can generate a large amount of power even in the high-speed rotation range. Moreover, since the responsiveness of speed control is improved, the gear change time can be shortened further.

The engine torque will not be decreased unnecessarily because the engine-torque decreasing control is started when the system voltage $V_{DC}$ reaches the predetermined first limit voltage $V_1$. Moreover, the engine-torque decreasing control prevents the terminal voltage of the capacitor in the inverter from excessively increasing, and avoids an overvoltage damage to the capacitor. When the increase of the system voltage $V_{DC}$ cannot be limited by the engine-torque decreasing control, an overvoltage damage to the capacitor can be reliably prevented by stopping power generation by the MG 11.

When the engine-torque decreasing control is finished, the control of the throttle valve, which has a low responsiveness, is first stopped. Therefore, the driving force requested by the driver can be achieved immediately after the control.

Second Embodiment

Figure 11:
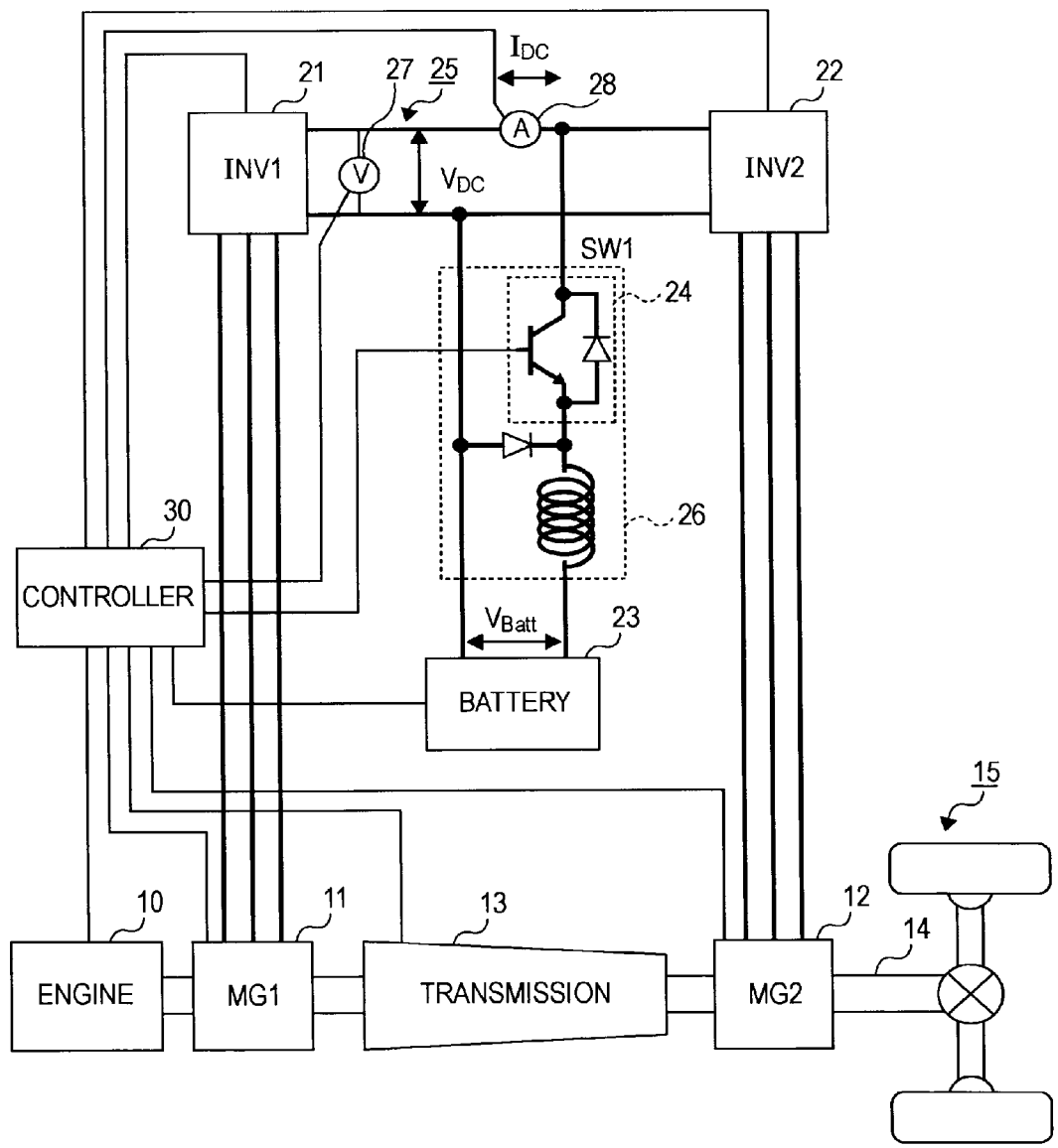
FIG. 11 is a block diagram showing the configuration of a driving system for a hybrid vehicle according to a second embodiment of the present invention.

FIG. 11 shows the configuration of a driving system for a hybrid vehicle according to a second embodiment of the invention. Hereinafter, components having functions similar to those in the first embodiment are denoted by the same reference numerals, and the prior descriptions are incorporated herein.

A driving force from an engine 10 and a MG 11 is subjected to speed reduction via a transmission 13, and is output to an output shaft 14.

The output shaft 14 is also coupled to a rotation shaft of a MG 12 (second motor/generator). The MG 12 generates electric power during deceleration or generates a driving force by receiving power supplied from a battery 23. The driving force output to the output shaft 14 and the driving force of the MG 12 are transmitted to right and left driving wheels 15 via a differential gear, thus driving the vehicle.

An inverter 22 is provided between the battery 23 and the MG 12, and is connected at a DC terminal to the battery 23 and at an AC terminal to the MG 12. The speed of the MG 12 is controlled by the inverter 22. The inverter 22 supplies power from the battery 23 to the MG 12, or charges the battery 23 with power generated by the MG 12.

The battery 23 is provided between an inverter 21 and the inverter 22. The inverters 21 and 22 are connected by a power line 25. By connecting the battery 23 to the power line 25, DC terminals of the inverters 21 and 22 are connected to the battery 23.

A switch 24 serving as a part of a step-down circuit 26 is provided in one of the connecting lines between the battery 23 and the power line 25. The connection between the driving system and the battery 23 can be readily controlled by opening and closing the switch 24. That is, the battery 23 can be freely and electrically disconnected from the driving system. When the switch 24 is open, the driving system and the battery 23 are electrically disconnected, and therefore, a system voltage $V_{DC}$ serving as the voltage of the power line 25 is determined by the relationship between the power generated by the MG 11 and the power consumption of the MG 12.

Therefore, the system voltage $V_{DC}$ can be arbitrarily adjusted by controlling the power generated by the MG 11 and the driving force of the MG 12.

The step-down circuit 26 is a step-down chopper circuit that controls opening and closing of the switch 24 so as to supply power from the power line 25 to the battery 23 when the system voltage $V_{DC}$ is higher than the battery voltage $V_{BATT}$. The switch 24 in the step-down circuit 26 serves as a switching means that connects and disconnects the power line 25 and the battery 23.

Similarly to the first embodiment, the transmission 13 is an automatic transmission having a plurality of shift positions, and needs to decrease the rotation speed of the engine 10 in an upshift. In the transmission, the target rotation speed of the engine 10 in an upshift is exclusively determined by the gear ratio of the transmission 13. Accordingly, in a gear shift operation, the speed of the MG 11 is controlled so as to obtain the target rotation speed of the engine 10. Since the speed of the motor can be controlled with high accuracy, unlike the engine and the clutch, the rotation speed of the engine 10 can be easily led to the target value by controlling the speed of the MG 11. Since the rotation speed of the engine 10 needs to be decreased in an upshift, a negative torque is applied by the MG 11 so that the MG 11 operates as a generator. Therefore, by increasing the power generated by the MG 11, a load torque applied to the engine 10 increases, and the rotation speed of the engine 10 can be quickly led to the target value.

In this case, the presence of the battery 23 may be disadvantageous, as described above.

Accordingly, in the second embodiment, the battery 23 is disconnected from the power line 25 by opening the switch 24 in a gear change operation. Then, the power generated by the MG 11 is supplied to the MG 12 so as to ensure the requested driving force for the vehicle in the gear change operation. In this case, when the power generated by the MG 11 becomes larger than the power consumed by the MG 12, the charges at the ends of the capacitors built in the inverters 21 and 22 increase, and the system voltage $V_{DC}$ also increases. Since the power generated by the MG 11 can be increased without depending on the battery voltage $V_{BATT}$, the rotation speed of the engine 10 can be quickly led to the target value.

However, when priority is given to the gear change time, the power generated by the MG 11 sometimes exceeds the driving force of the MG 12 that is determined by the required driving force and the target transmission gear ratio.

When such a surplus power is produced, it can be charged in the battery 23 by the step-down control of the step-down circuit 26. Since the power generated by the MG 11 can be increased without depending on the battery voltage, a quick gear change is possible.

Third Embodiment

Figure 12:
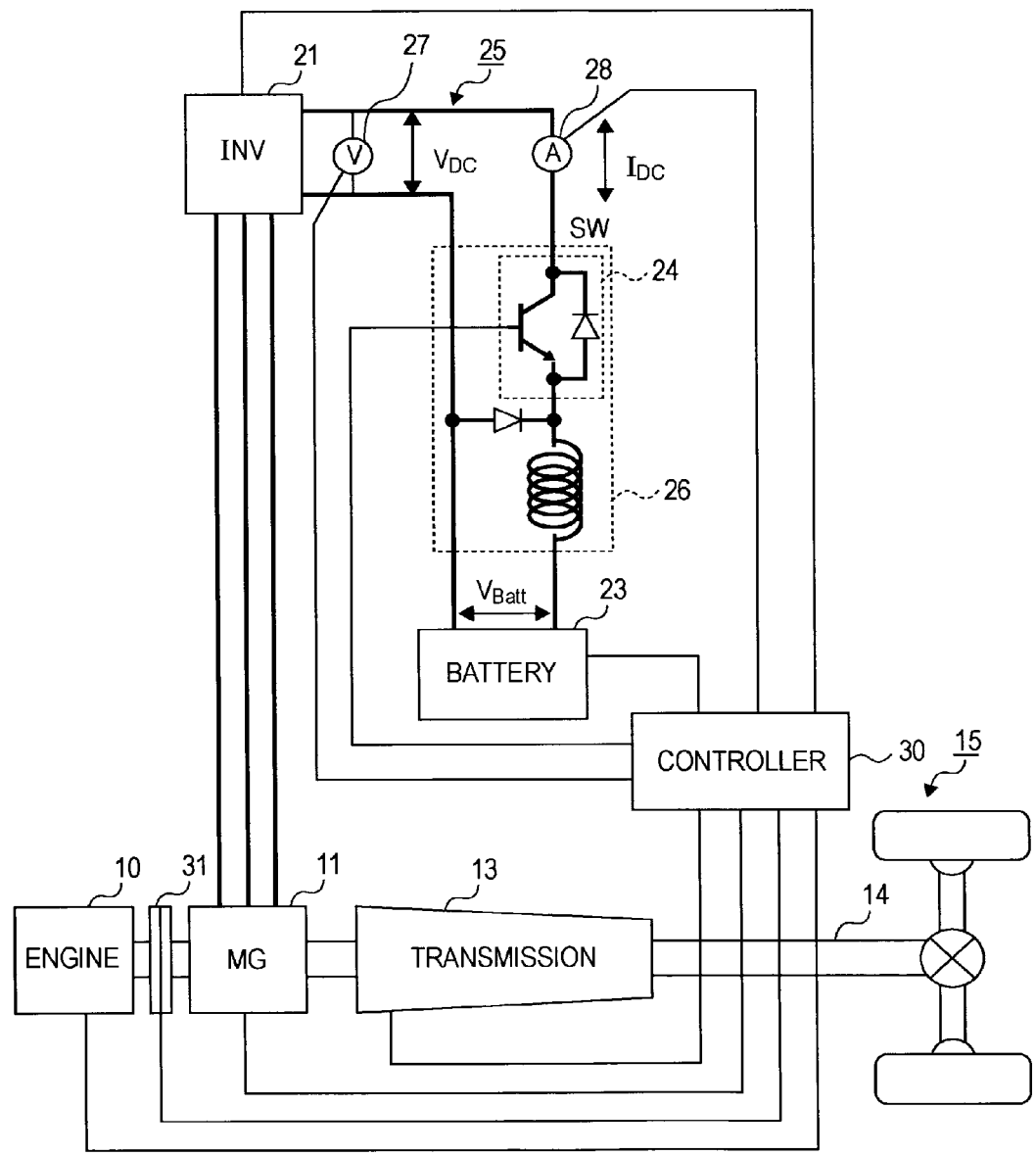
FIG. 12 is a block diagram showing the configuration of a driving system for a hybrid vehicle according to a third embodiment of the present invention.

FIG. 12 shows the configuration of a driving system in a hybrid vehicle according to a third embodiment of the invention. The hybrid vehicle according to the third embodiment is different from the first embodiment in that a clutch 31 is provided between an engine 10 and a MG 11, as shown in FIG. 12.

By connecting the clutch 31 between the engine 10 and the MG 11, the driving force of the engine 10 is transmitted to an output shaft 14 via the MG 11 and a transmission 13. In contrast, the driving force from the engine 10 is interrupted by disengaging the clutch 31. In this example, transmission 13' is preferably an automatic mechanical transmission (AMT) having a plurality of shift positions. Alternatively, a continuously variable mechanical transmission may be used.

For example, in a case in which the vehicle merges onto the highway, when the driver accelerates the vehicle to a relatively high speed. When the speed reaches a desired speed range, the driver may release the accelerator pedal because additional acceleration is unnecessary. Hereinafter, this operation of the driver will be referred to as foot release.

Since the engine generally has high efficiency in a low-speed rotation range, when foot release is performed, the transmission may be shifted to a higher gear in order to decrease the rotation speed of the engine 10. Hereinafter, this gear shift will be referred to as a foot-release upshift. By the foot-release upshift, the kinetic energy of the engine 10 is consumed as heat and a negative torque of the engine 10.

In this case, it is preferable that the MG 11 in the hybrid vehicle be in a high-efficiency state in preparation for regeneration, which will be performed when a deceleration request is made after the foot release. As described above, in a general synchronous motor or generator, it can be expected that the output and efficiency are improved by increasing the supplied voltage. These advantages are more apparent in a relatively high-speed rotation range.

However, because of the presence of a battery 23, it is difficult to increase the system voltage $V_{DC}$ above the battery voltage $V_{BATT}$, and the upper limit of the power generated by the MG 11 depends on the battery voltage $V_{BATT}$. Further, when a foot-release upshift is performed, the rotation speed of the MG 11 decreases as the engine rotation speed decreases. Therefore, the advantages are not provided even by increasing the terminal voltage $V_{DC}$ of the inverter.

Accordingly, in the third embodiment, the voltage supplied to the MG 11 is increased, and the rotation speed of the MG 11 is maintained at a high speed in the following manner, thereby controlling power generation while the MG 11 is placed in a high-efficiency state.

First, when a foot release is detected, the shift position of the transmission is maintained, and the MG 11 is maintained in a high-speed rotation state. The switch 24 is opened and the battery 23 is electrically disconnected from a power line 25 so that the system voltage $V_{DC}$ can increase without depending on the battery voltage $V_{BATT}$. Then, power generation is controlled by using a deceleration inertial energy of the engine 10 during the foot release, thereby increasing the system voltage $V_{DC}$. Alternatively, in order to increase the system voltage $V_{DC}$ to a predetermined voltage, the torque decrease time of the engine 10 may be prolonged so that engine torque does not become zero even when foot release is performed.

When the driver makes a brake request later, the clutch 31 is released, and regeneration is started by the MG 11 according to the brake request. In this case, power generated by the MG 11 is charged in the battery 23 under the step-down control by a step-down circuit 26.

In a combination of a large-displacement engine and a MG, a high starting torque is required of the MG, and an assist request for the MG is lessened in a medium rotation speed range in which a sufficient engine torque can be produced, as described above. However, during regeneration, when the operating range of the MG 11 is extended, regeneration energy is increased and efficiency is enhanced. Accordingly, the system voltage $V_{DC}$ can be increased and the operating range of the MG 11 can be extended by electrically disconnecting the battery 23 from the power line 25 and generating a small transient energy by the engine 10.

Figure 13:
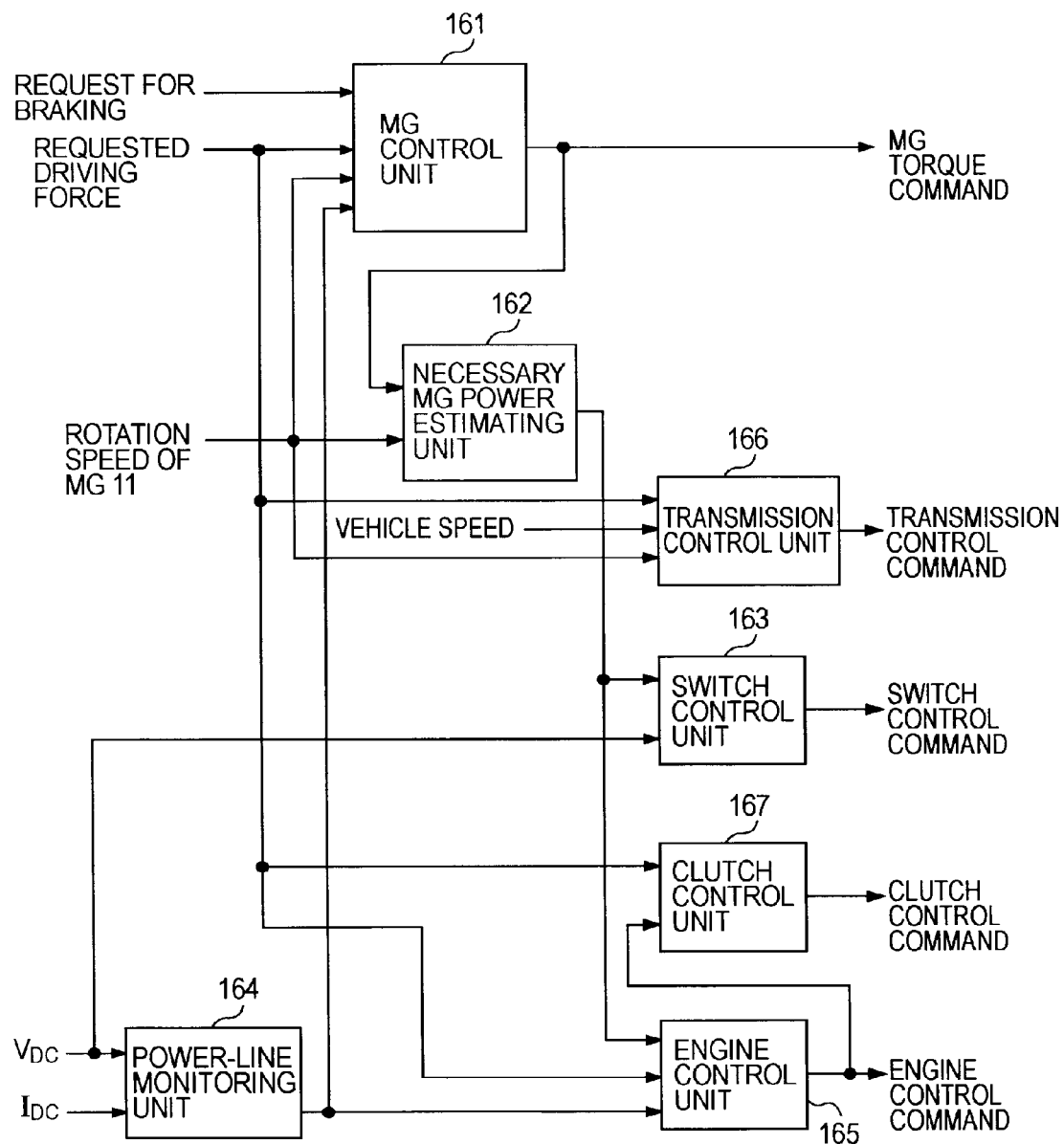
FIG. 13 is a control block diagram explaining foot-release control in the hybrid vehicle of the third embodiment.

FIG. 13 is a control block diagram showing a foot-release control operation performed by a controller 30 in the hybrid vehicle according to the third embodiment.

A voltage (system voltage) $V_{DC}$ and a current $I_{DC}$ of the power line 25 are input to a power-line monitoring unit 164.

The power-line monitoring unit 164 sets/resets an engine-torque control flag for an engine control unit 165 on the basis of these input values. The power-line monitoring unit 164 also sets/resets a speed control stop flag for a MG control unit 161.

In a state in which the battery 23 is disconnected from the system, the system voltage $V_{DC}$ varies depending on the power generated by the MG 11. In this case, when the system voltage $V_{DC}$ increases in accordance with the generated power and exceeds a predetermined value $V_1$, an engine-torque control flag is set so as to decrease the engine torque. Then, when the system voltage $V_{DC}$ further increases and exceeds a predetermined value $V_2$, a speed control stop flag for the MG 11 is set so as to decrease the power generated by the MG 11.

Since the capacity of the capacitor built in the inverter 21 is small, the system voltage $V_{DC}$ can be set at a desired voltage only by generating a transient energy of the engine 10 in foot release. However, the generated power may be insufficient according to the circumstance. In such a case, the torque of the engine 10 is prevented from becoming zero until the system voltage $V_{DC}$ reaches the target value.

A driving force requested by the driver, a brake request from the driver, a real rotation speed of the MG 11, and a speed control stop flat are input to the MG control unit 161.

When the driving force requested by the driver is zero and the rotation speed of the MG 11 is higher than a rotation speed at which the effect of high-efficiency regeneration is achieved by increasing the system voltage $V_{DC}$, the MG control unit 161 determines whether to prepare high-efficiency regeneration. The MG control unit 161 also calculates a braking torque for the MG 11 according to the brake request from the driver.

The real rotation speed of the MG 11 and the braking torque of the MG 11 are input to a necessary MG power estimating unit 162.

On the basis of these input values, the necessary MG power estimating unit 162 calculates a system voltage $V_{DC}$ corresponding to the amount of power generated by the MG 11. When the calculated system voltage $V_{DC}$ is higher than or equal to the battery voltage $V_{BATT}$, the necessary MG power estimating unit 162 issues a command to disconnect the battery 23.

The vehicle speed, the driving force requested by the driver, and the real rotation speed of the MG 11 are input to a transmission control unit 166.

On the basis of these input values, the transmission control unit 166 determines whether the current shift position should be maintained. The transmission control unit 166 also determines on the basis of the rotation speed of the MG 11 whether to prepare high-efficiency regeneration. The transmission control unit 166 has a map that determines the target shift position by the vehicle speed and the requested driving force, and normally exerts gear change control when foot release is performed. However, during preparation of high-efficiency regeneration of the MG 11, normal foot-release upshift control is cancelled, and the current shift position is maintained.

The system voltage $V_{DC}$ and the system voltage $V_{DC}$ calculated from the amount of power generated by the MG 11 are input to a switch control unit 163.

On the basis of these input values, the switch control unit 163 issues a control command to the switch 24 so as to open/close the switch 24. That is, when the calculated system voltage $V_{DC}$ is higher than or equal to the battery voltage $V_{BATT}$, the switch 24 is opened to disconnect the battery 23 from the power line 25. Subsequently, step-down control is exerted by using the step-down circuit 26. By adjusting the open/close time of the switch 24, power is supplied to the battery 23 while maintaining the system voltage $V_{DC}$ at a voltage such as to achieve high-efficiency power generation even when the rotation speed of the MG 11 is high. As the rotation speed of the MG 11 decreases, the necessary voltage of the MG 11 decreases. When the necessary voltage becomes equal to the voltage of the battery 23, the switch 24 is closed to connect the battery 23 and the power line 25.

The driving force requested by the driver, the system voltage $V_{DC}$ calculated from the amount of power generated by the MG 11, and an engine-torque control flag are input to the engine control unit 165.

The engine control unit 165 normally controls the torque of the engine 10 according to the driving force requested by the driver. When the system voltage $V_{DC}$ increases depending on the power generated by the MG 11 and exceeds a predetermined value, the engine control unit 165 exerts engine-torque decreasing control.

The driving force requested by the driver and the torque of the engine 10 are input to a clutch control unit 167.

On the basis of these input values, the clutch control unit 167 engages/disengages the clutch 31. That is, when the engine torque from the engine control unit 165 is zero, or when the braking force is requested by the driver, the clutch control unit 167 issues a command to disengage the clutch 31.

FIG. 14 is a flowchart showing a foot-release control procedure performed by the controller 30 in the hybrid vehicle according to the third embodiment.

First, it is checked whether foot release is performed by the driver. When the requested driving force becomes about zero, the rotation speed of the MG 11 is checked in Step S401.

In Step S402, it is determined whether the rotation speed of the MG 11 is higher than or equal to a predetermined rotation speed at which the efficiency and torque can be increased by increasing the system voltage $V_{DC}$. When the rotation speed of the MG 11 is lower than the predetermined rotation speed, foot-release control has little effect. Therefore, normal gear change control is exerted in Step S403. Since normal gear change control is exerted in Step S403, when foot release occurs, an upshift operation is performed so as to decrease the rotation speed of the engine 10.

In contrast, when the rotation speed of the MG 11 is higher than or equal to the predetermined rotation speed, Step S404 is performed to execute foot-release control.

In Step S404, normal gear change control (foot-release upshift) is prevented, and foot-release control is exerted so as to maintain the current shift position.

In Step S405, a target voltage of the system voltage $V_{DC}$ is set. In order to cope with large regenerative braking, in consideration of the loss at the rotation speeds, the target value is set at a voltage at which the MG 11 outputs an amount of power corresponding to the maximum charge/discharge power of the battery 23.

In Step S406, the battery 23 is disconnected from the power line 25.

In Step S407, power is generated by the MG 11 by using the torque of the engine 10, thereby increasing the system voltage $V_{DC}$. Although the torque of the engine 10 decreases in synchronization with the foot release, since the terminal voltage of the inverter 21 can be increased by small energy, transient energy corresponding to the torque response delay is used positively.

In Step S408, it is determined whether the system voltage $V_{DC}$ reaches the target value set in Step S405. When the system voltage $V_{DC}$ does not reach the target value, Step S407 is performed again so as to adjust the generated power by increasing the torque of the engine 10. In contrast, when the system voltage $V_{DC}$ reaches the target value, Step S409 is performed. The engine 10 is less responsive than the MG 11, and the engine torque may be slightly increased, for example, by changing the ignition timing. Therefore, this increase of the engine torque does not give an uncomfortable feeling to the driver.

In Step S409, the voltage is adjusted by step-down control of the step-down circuit 26. When the system voltage $V_{DC}$ transiently exceeds the target voltage because of the power generated by the MG 11, a surplus power is absorbed by the battery 23, so that the charge in the capacitor is reduced, and the system voltage $V_{DC}$ is made equal to the target value.

In Step S410, for later regenerative braking, the torque of the engine 10 is controlled so as to be zero in order to avoid a shock caused by releasing the clutch 31. When a brake request is made, the clutch 31 is released, the engine 10 is stopped, and regenerative braking is performed.

In this case, when a brake request is not made by depressing the brake pedal, a coasting deceleration force is generated by the MG 11. Although the coasting deceleration force is smaller than a force of forcible braking by the brake pedal, when the voltage of the MG 11 is high, regeneration can be preformed with high efficiency because field weakening is necessary. Since forcible deceleration force and coasting deceleration force are both produced by the power generated by the MG 11, the voltage of the generated power is decreased by step-down control of the step-down circuit 26, and the power is charged in the battery 23.

As the rotation speed of the MG 11 decreases, the necessary voltage of the MG 11 decreases. When the necessary voltage becomes equal to the voltage of the battery 23, the power line 25 and the battery 23 are connected, and the foot-release control is completed.

According to the above-described third embodiment, in a case in which the driving force requested by the driver is zero (foot release), when the rotation speed of the MG 11 exceeds the rotation speed at which the high charging efficiency can be achieved by increasing the system voltage $V_{DC}$ higher than the battery voltage $V_{BATT}$, the current shift position is maintained.

Then, the battery 23 is disconnected from the power line 25 so as to bring about a state in which the system voltage $V_{DC}$ can be increased by power generation of the MG 11 without depending on the battery voltage $V_{BATT}$.

Since the upshift operation is not performed, a high-speed rotation range with high motor efficiency can be maintained. Further, since the power generated by the MG 11 can be increased independently of the battery voltage $V_{BATT}$, the system voltage can be increased without using the step-up circuit. Moreover, while the motor is a small high-torque motor that provides a high counter electromotive voltage, regenerative braking can be efficiently performed in response to a brake request. For this reason, regenerative energy increases, and this improves the fuel economy. In addition, since a gear change is not frequently performed during deceleration, the gear change quality is improved.

Since power generation of the MG 11 is controlled by using the rotation inertial energy of the engine 10, the torque of the engine 10 can be estimated on the basis of the change in the system voltage, and can be controlled easily.

Even when the system voltage $V_{DC}$ exceeds the requested voltage of the MG 11 during the power generation control of the MG 11, it is prevented from further increasing by the step-down control of the step-down circuit 26, and a surplus power can be charged in the battery 23. Therefore, the MG 11 can generate a large amount of power even in a high-speed rotation range.

By disengaging the clutch 31 to disconnect the engine 10, regeneration can be performed more efficiently. Since the low shift position remains selected, the amplification factor of the engine torque is higher in reacceleration than in normal control. This can enhance the acceleration performance.

What is claimed is:

1. A hybrid-vehicle control system for controlling a vehicle driveline having an engine, a transmission, a first motor/generator provided between the engine and the transmission, and a battery, the hybrid-vehicle control system comprising:
   a first inverter, coupled to the first motor/generator;
   a voltage adjusting circuit coupled to the first inverter and to the battery, the voltage adjusting circuit being configurable to electrically connect the battery and the first inverter, to electrically disconnect the battery and the first inverter, and to adjust a voltage from the first inverter to the battery; and
   a controller, coupled to at least the first inverter, the voltage adjusting circuit, the battery, the transmission, the controller being configured to issue signals to shift the transmission to a target shift position during a gear shift operation according to a driving force requested by a driver, to control generation of electrical power by the first motor/generator during the gear shift operation so that the engine is controlled to a rotation speed corresponding to the target shift position of the transmission, and to calculate a requested output voltage of the first motor/generator from power generated by the first motor/generator during the gear shift operation,
   wherein, when the requested output voltage becomes greater than or equal to a predetermined voltage during the gear shift operation, the controller controls the voltage adjusting circuit to electrically disconnect the battery from the first inverter to raise an output voltage of the first inverter to the predetermined voltage, and to adjust the output voltage to the first inverter to a second voltage for charging the battery.

2. The hybrid-vehicle control system of claim 1, wherein the predetermined voltage is a voltage of the battery.

3. The hybrid-vehicle control system of claim 1, wherein the voltage adjusting circuit charges the battery while maintaining the output voltage of the first motor/generator at the requested output voltage.

4. The hybrid-vehicle control system of claim 1, wherein the controller is configured to control the engine to decrease a torque produced by the engine when the output voltage of the first inverter becomes higher than or equal to a predetermined first limit voltage during the gear shift operation.

5. The hybrid-vehicle control system of claim 4, wherein the controller is further configured to control the engine to increase the torque produced by the engine when the torque of the engine decreases and the output voltage of the first motor/generator falls below the predetermined first limit voltage.

6. The hybrid-vehicle control system of claim 4, wherein the controller is further configured to control the first motor/generator to reduce the electric power generated by the first motor/generator when the output voltage of the first inverter reaches a predetermined second limit voltage higher than the predetermined first limit voltage.

7. The hybrid-vehicle control system of claim 1, wherein the voltage adjusting circuit comprises a step-down chopper circuit having a semiconductor switching element.

8. The hybrid-vehicle control system of claim 7, wherein the semiconductor switching element is responsive to the controller and is capable of being switched to an off state.

9. The hybrid-vehicle control system of claim 7, wherein the controller is further configured to perform engine torque control for decreasing the torque of the engine when a switching frequency of the semiconductor switching element exceeds a predetermined frequency.

10. The hybrid-vehicle control system of claim 1, wherein the driveline further comprises a second motor/generator provided between the transmission and a vehicle driving shaft and a second inverter coupled to the second motor/generator and to the first inverter; and
wherein the controller is further configured to control the driveline such that electrical power generated by the first motor/generator is supplied to drive the second motor/generator during the gear shift operation.

11. The hybrid-vehicle control system of claim 1, wherein the controller is further configured to cause the voltage adjusting circuit to electrically disconnect the battery while maintaining a shift position of the transmission, and to increase the output voltage of the first inverter by controlling power generation of the first motor/generator when the driving force requested by the driver becomes zero or less and when the rotation speed of the first motor/generator is more than or equal to a predetermined rotation speed.

12. The hybrid-vehicle control system of claim 11, wherein the predetermined rotation speed is a rotation speed at which an effect is obtained by making the output voltage of the first motor/generator higher than a voltage of the battery.

13. The hybrid-vehicle control system of claim 11, wherein the driveline further comprises a clutch provided between the engine and the first motor/generator and wherein the controller is further configured to disengage the clutch when the output voltage of the first motor/generator equals the requested output voltage and the torque of the engine is approximately zero.

14. A method for controlling a hybrid vehicle driveline comprising the steps of:
shifting a transmission to a target shift position during a gear shift operation according to a driving force requested by a driver;
controlling power generation of a first motor/generator during the gear shift operation to cause an engine to go to a predetermined rotation speed corresponding to the target shift position of the transmission;
calculating a requested output voltage of the motor/generator from power generated by the motor/generator during the gear shift operation;
electrically disconnecting a battery from the motor/generator by controlling a switching element when the requested output voltage becomes higher than or equal to a predetermined voltage during the gear shift operation; and
charging the battery by controlling a voltage adjusting circuit to cause a voltage to be applied to the battery that is lower than the output voltage of the motor/generator.

15. The method of claim 14, further comprising the step of applying electrical power generated by the first motor/generator to a second motor/generator to apply driving force to the driveline during the gear shift operation.

16. The method of claim 14, further comprising the steps of:
detecting when a driving force requested by the driver becomes zero or less and the rotation speed of the first motor/generator is more than or equal to a predetermined rotation speed;
maintaining a shift position of the transmission;
causing the voltage adjusting circuit to electrically disconnect the battery; and
increase the output voltage of the first inverter by controlling power generation of the first motor/generator.

17. A control system for controlling a hybrid vehicle driveline, comprising:
means for shifting a transmission to a target shift position during a gear shift operation according to a driving force requested by a driver;
means for controlling power generation of a first motor/generator during the gear shift operation to cause an engine to go to a predetermined rotation speed corresponding to the target shift position of the transmission;
means for calculating a requested output voltage of the motor/generator from power generated by the motor/generator during the gear shift operation;
means for electrically disconnecting a battery from the motor/generator by controlling a switching element when the requested output voltage becomes higher than or equal to a predetermined voltage during the gear shift operation; and
means for charging the battery by controlling a voltage adjusting circuit to cause a voltage to be applied to the battery that is lower than the output voltage of the motor/generator.

18. The control system of claim 17, further comprising:
means for applying electrical power generated by the first motor/generator to a second motor/generator to apply driving force to the driveline during the gear shift operation.

19. The method of claim 17, further comprising:
means for detecting when a driving force requested by the driver becomes zero or less and the rotation speed of the first motor/generator is more than or equal to a predetermined rotation speed;
means for maintaining a shift position of the transmission;
means for causing the voltage adjusting circuit to electrically disconnect the battery; and
means for increasing the output voltage of the first inverter by controlling power generation of the first motor/generator.

* * * * *